United States Patent
Schultz

(10) Patent No.: US 11,941,778 B2
(45) Date of Patent: *Mar. 26, 2024

(54) SYSTEM AND METHOD FOR FORMING A VIDEO STREAM CONTAINING GIS DATA IN REAL-TIME

(71) Applicant: Pictometry International Corp., Rochester, NY (US)

(72) Inventor: Stephen L. Schultz, West Henrietta, NY (US)

(73) Assignee: Pictometry International Corp., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,111

(22) Filed: Jun. 17, 2019

(65) Prior Publication Data

US 2019/0304062 A1 Oct. 3, 2019

Related U.S. Application Data

(63) Continuation of application No. 13/492,107, filed on Jun. 8, 2012, now Pat. No. 10,325,350.

(Continued)

(51) Int. Cl.
G06T 3/40 (2006.01)
G06T 1/00 (2006.01)
G06T 3/4038 (2024.01)

(52) U.S. Cl.
CPC .......... *G06T 3/4038* (2013.01); *G06T 1/0007* (2013.01)

(58) Field of Classification Search
CPC ......... G01C 11/025; G01C 11/02; G01S 1/02; G06T 3/4038; G06T 1/0007

(Continued)

(56) References Cited

U.S. PATENT DOCUMENTS

2002/0047895 A1* 4/2002 Bernardo ................ G06F 16/29
382/284
2004/0010801 A1 1/2004 Kim et al.
(Continued)

OTHER PUBLICATIONS

PCT Search Report & Written Opinion dated Jun. 8, 2013 for Application No. PCT/US2002041524.

(Continued)

*Primary Examiner* — Joseph G Ustaris
*Assistant Examiner* — Jimmy S Lee
(74) *Attorney, Agent, or Firm* — DUNLAP CODDING, P.C.

(57) ABSTRACT

Methods and systems are disclosed including a method comprising, with one or more computer processors, associating geographic position data and orientation data of the one or more video capture devices with each video frame of a geographic area; analyzing the geographic position data and orientation data and the video frames to generate geo-referencing data for pixels of the video frames; determining a geographical boundary of the video frame from the geo-referencing data; receiving, one or more layers of geographic information system (GIS) data using the determined geographical boundary of the video frame; and determining overlay position of the geographic information system (GIS) data on the video frames in real time based at least in part on the geo-referencing data; and overlaying at least a portion of the geographic information system (GIS) data on the video frames based on the overlay position.

19 Claims, 18 Drawing Sheets

Related U.S. Application Data

(60) Provisional application No. 61/495,775, filed on Jun. 10, 2011.

(58) Field of Classification Search
USPC .................................. 348/116, 144, E07.085
See application file for complete search history.

(56) References Cited

U.S. PATENT DOCUMENTS

| | | | |
|---|---|---|---|
| 2005/0083412 A1* | 4/2005 | Murphy | H04B 7/18595 725/67 |
| 2005/0195206 A1* | 9/2005 | Wogsberg | H04N 5/265 345/547 |
| 2005/0253928 A1* | 11/2005 | McKeown | G06V 10/143 348/E5.09 |
| 2006/0142943 A1* | 6/2006 | Park | G01C 11/02 701/469 |
| 2006/0271287 A1* | 11/2006 | Gold | G01C 21/3673 701/426 |
| 2006/0271949 A1 | 11/2006 | Perry et al. | |
| 2007/0043504 A1* | 2/2007 | Dorfman | G09B 29/006 701/484 |
| 2008/0068507 A1 | 3/2008 | Krause et al. | |
| 2008/0158256 A1 | 7/2008 | Russell et al. | |
| 2008/0183030 A1* | 7/2008 | Shiri | A63F 13/45 128/920 |
| 2008/0204570 A1* | 8/2008 | Schultz | H04N 23/90 348/222.1 |
| 2008/0211908 A1* | 9/2008 | Dvir | G08B 13/19604 348/E5.065 |
| 2009/0245581 A1* | 10/2009 | Dey | F17D 5/06 382/104 |
| 2010/0265329 A1* | 10/2010 | Doneker | H04N 23/695 348/E5.024 |
| 2011/0043627 A1* | 2/2011 | Werling | G06T 19/006 348/143 |
| 2011/0090399 A1* | 4/2011 | Whitaker | G06F 16/78 707/769 |

OTHER PUBLICATIONS

IP Australia—Australian Government, Patent Examination Report No. 1 regarding Australian Patent Application No. 2012364820, dated Jan. 27, 2016.

Pictometry International Corp.; Response to Australian Patent Examination Report No. 1 regarding Australian Patent Application No. 2012364820, dated May 17, 2016.

Pictometry International Corp.; Response to European Patent Office Supplementary European Search Report and Written Opinion regarding EPO Application No. 12864857.3-1906, dated Feb. 26, 2016.

European Patent Office, Supplementary European Search Report and Written Opinion regarding Application No. 12864857.3-1906, dated Aug. 10, 2015.

Lewis, Paul; Linking Spatial Video and GIS; PhD Thesis, Jan. 1, 2009, http://eprints.nuim.ie/1828.

Fotheringham et al.; Spatial Video and GIS, International Journal of Geographical Information Science, May 1, 2011, p. 697, http://www.tandfonline.com/doi/abs/10.1080/13658816.2010.505196.

Goodchild et al.; Integrating GIS and Spatial Data Analysis—Problems and Possibilities, Int. J. Geographical Information Systems, Jan. 1, 1992, pp. 407-423, http://www.geog.ucsb.edu/~good/papers/184.pdf.

Zheng et al.; Research and Applications on Georeferenced Multimedia: A Survey; Multimedia Tools and Applications, Kluwer Academic Publishers, Bo, vol. 51, No. 1, Nov. 5, 2010, pp. 77-98.

Hwang et al.; MPEG-7 Metadata for Video-Based GIS Applications; Learning from Earth's Shapes and Sizes: IGARSS 2003; 2003 IEEE International Geoscience and Remote Symposium, Centre de Congres Pierre Baudis, Toulouse, France, Jul. 21-25, 2003, Proceedings IEEE International Geoscience and Remote Sensing Sym, vol. 6, Jul. 21, 2003, pp. 3641-3643.

Mexican Institute of Industrial Property; Official Letter regarding patent application MX/a/2013/014535 "System and Method for Forming a Video Stream Containing GIS Data in Real-Time"; Jul. 29, 2015.

European Patent Office, Examination Report regarding European Patent Application No. 12864857.3, dated Mar. 18, 2019.

Montoya, Lorena, "Geo-data acquisition through mobile GIS and digital video: an urban disaster management perspective", Environmental Modelling & Software, vol. 18, No. 10, pp. 869-876; Dec. 1, 2003.

Pictometry International Corp., Response to Office Action regarding European Patent Application No. 12864857.3, dated Aug. 6, 2019.

European Patent Office, Office Action regarding European Patent Application No. 12864857.3, dated Nov. 21, 2019.

Pictometry International Corp., Response to Office Action regarding European Patent Application No. 12864857.3, dated May 4, 2020.

Canadian Intellectual Property Office, Office Action regarding Canadian Patent Application No. 2,835,290, dated Mar. 12, 2018.

Pictometry International Corp., Response to Office Action regarding Canadian Patent Application No. 2,835,290, dated Sep. 10, 2018.

Canadian Intellectual Property Office, Office Action regarding Canadian Patent Application No. 2,835,290, dated Mar. 5, 2019.

Pictometry International Corp., Response to Office Action regarding Canadian Patent Application No. 2,835,290, dated Sep. 4, 2019.

European Patent Office, Office Action regarding European Patent Application No. 12864857.3, dated Jun. 18, 2021.

Pictometry International Corp., Response to Jun. 18, 2021 Office Action regarding European Patent Application No. 12864857.3, dated Dec. 29, 2021.

Pictometry International Corp., Response to European Patent Office's Communication of Oct. 13, 2022 pursuant to Article 94(3) EPC regarding European Patent Application No. 12864857.3, dated Apr. 18, 2023.

European Patent Office, Communication pursuant to Article 94(3) EPC regarding European Patent Application No. 12864857.3, dated Oct. 13, 2022.

\* cited by examiner

SYSTEM AND METHOD FOR FORMING A VIDEO STREAM CONTAINING GIS DATA IN REAL-TIME

CROSS-REFERENCE TO RELATED APPLICATIONS

The present application is a continuation of and claims priority to U.S. patent application Ser. No. 13/492,107, filed Jun. 8, 2012; which claims the benefit of U.S. Provisional Patent Application Ser. No. 61/495,775, filed on Jun. 10, 2011; all of which are hereby incorporated by reference in their entirety.

BACKGROUND

As background, in the remote sensing/aerial imaging industry, imagery may be used to capture views of a geographic area. The imagery may be used to measure objects and structures within images, as well as, to be able to determine geographic locations of points within images.

Geographic information about objects within an image may be associated with that image. Such images are generally referred to as "geo-referenced images". Geo-referenced images may include two basic categories: captured imagery (images as captured by the camera or sensor employed), and projected imagery (images processed and converted to confirm to a mathematical projection).

Geo-referenced aerial images may be produced using hardware and/or software systems that may geo-reference airborne sensor data. For example, methods and apparatus for mapping and measuring land are described in U.S. Pat. No. 5,247,356, which is hereby incorporated by reference in its entirety. In addition, a system produced by Applanix Corporation of Richmond Hill, Ontario, Canada and sold under the trademark "POS AV" includes a hardware and software system for directly geo-referencing sensor data. This system may be mounted on a moving platform, such as an airplane, and directed towards the ground.

Imagery may begin as captured imagery. The captured imagery may need further processing to create projected imagery that is geo-referenced. The conventional method for processing captured imagery into projected imagery is ortho-rectification. Ortho-rectification aligns an image to an orthogonal or rectilinear grid (i.e., composed of rectangles). Captured imagery used to create an ortho-rectified image may typically include a nadir image—that is, an image captured with the camera pointing straight down.

Direct geo-referencing is the direct measurement of sensor position and orientation (e.g., exterior orientation parameters), without the need for additional ground information over the project area. These parameters may include data from an airborne sensor that may be geo-referenced to the Earth and/or local mapping frame. Examples of airborne sensors may include: aerial cameras (digital or film-based), multi-spectral or hyper-spectral scanners, SAR, or LIDAR.

Geographical location data and/or geospatial data may be stored, organized, and/or analyzed in a Geographical Information System (hereinafter "GIS" or "GISs"). In aerial mapping, captured aerial images may be warped to fit a pre-defined mapping grid (e.g., U.S. State Plane, 1983 North American Datum, in U.S. Survey Feet). When an image frame is displayed, geographical bounds of that image frame may be used to retrieve GIS data in that area. Each geographic point location may be then translated from geographic coordinates (e.g., latitude/longitude, X/Y coordinates) to image frame coordinates (e.g., pixel row/column) using mapping information surrounding the image frame. For traditional nadir imagery, translation from geographic coordinates to image coordinates may be fairly straight forward as the image may be warped to fit a mapping grid (e.g., using an ortho-rectification process). For oblique imagery, however, such translation may be more complex, and computation-intensive as some three dimensional features may become distorted during image processing.

Multiple captured images may also be combined into one or more larger composite images. The larger composite images may cover larger geographic areas. For example, the composite image may be an ortho-mosaic image created from a series of overlapping or adjacent captured nadir images. The overlapping or adjacent images may be mathematically combined into a single ortho-rectified processed composite image.

Generally, in creating an ortho-mosaic image a rectilinear grid may be created. For example, the rectilinear grid may include an ortho-mosaic image, wherein every grid pixel covers the same amount of area on the ground. The location of each grid pixel may be determined from the mathematical definition of the grid. Generally, this means the grid may include a starting or origin location (e.g., X and Y location), and a grid/pixel size (e.g., X and Y grid/pixel size). As such, the location of any pixel may be determined by:

$$X_{Origin} + X_{Size} \times X_{Column\ Pixel} = X_{Pixel} \quad (EQ.\ 1)$$

$$Y_{Origin} + Y_{Size} \times X_{Row\ Pixel} = Y_{Pixel} \quad (EQ.\ 2)$$

The available nadir images may be evaluated to determine if the images cover the same point on the ground as the grid pixel being filled. If so, a mathematical formula may be used to determine where that point on the ground projects up onto the camera's pixel image map, and that resulting pixel value may be then transferred to the grid pixel.

While the above methodology may be applied to individual video frames, the ability to geo-reference and overlay GIS data in real-time at full motion video frame rates has not been achieved by currently available systems for several reasons. For example, the ortho-rectification procedure may be highly computation-intensive (e.g., elevation data). Even further, the computational demands increase exponentially as the frame rate increases. For the frame rate required for full motion video (e.g., approximately twelve to thirty frames per second), the computational requirements make a real-time system impractical.

Current art, due to its computational limitations, may store a single geographic position for each frame of a video. As such, the video may be found in a GIS data search, however, there may be limitations for geographical location determinations for each pixel in the video frame(s). Additionally, such limits may not include measurement of distances between objects in the video frame(s) and/or overlay of GIS data over a series of video frame(s) at full motion video rates in real-time.

Existing systems overlaying information onto full motion video streams in real-time may operate by calibrating to specific targets. For example, a fan of the National Football League may be familiar with overlay graphics on the line of scrimmage, the first down marker, and the like. Such systems work, not through geo-referencing of the imagery, but by calibrating the cameras to the field in that specific football stadium, and including manual information input for the computers to then overlay on the video stream via chroma-key methodology. If the cameras are pointed anywhere but that particular football field for which they are calibrated, the overlays may not be at the correct location because the images are not georeferenced.

A recent image processing technique, introduced by Pictometry International Corp., warps a grid to an image instead of warping the image to fit the grid. This is especially interesting for oblique image processing, as oblique images (i.e., non-nadir images) may typically introduce gross three dimensional object distortions when warped to fit a mapping grid. Further, the development of a tessellated ground plane includes a means to define the surface of the Earth under an oblique image. The systems and methods for determining tessellated ground planes are further described in detail in U.S. Pat. No. 7,424,133, which is hereby incorporated by reference in its entirety. By capturing all of the interior and exterior parameters surrounding the image, Pictometry may be able to determine locations, derive measurements, and/or overlay GIS data all with a degree of accuracy previously unachieved for oblique imagery.

Another recent approach by Pictometry International Corporation includes the systems and methods for single ray projection also described in U.S. Pat. No. 7,424,133. These methods, while more accurate than ortho-rectification, may be too slow for real-time processing at full motion video frame rates.

DETAILED DESCRIPTION

Figure 1:
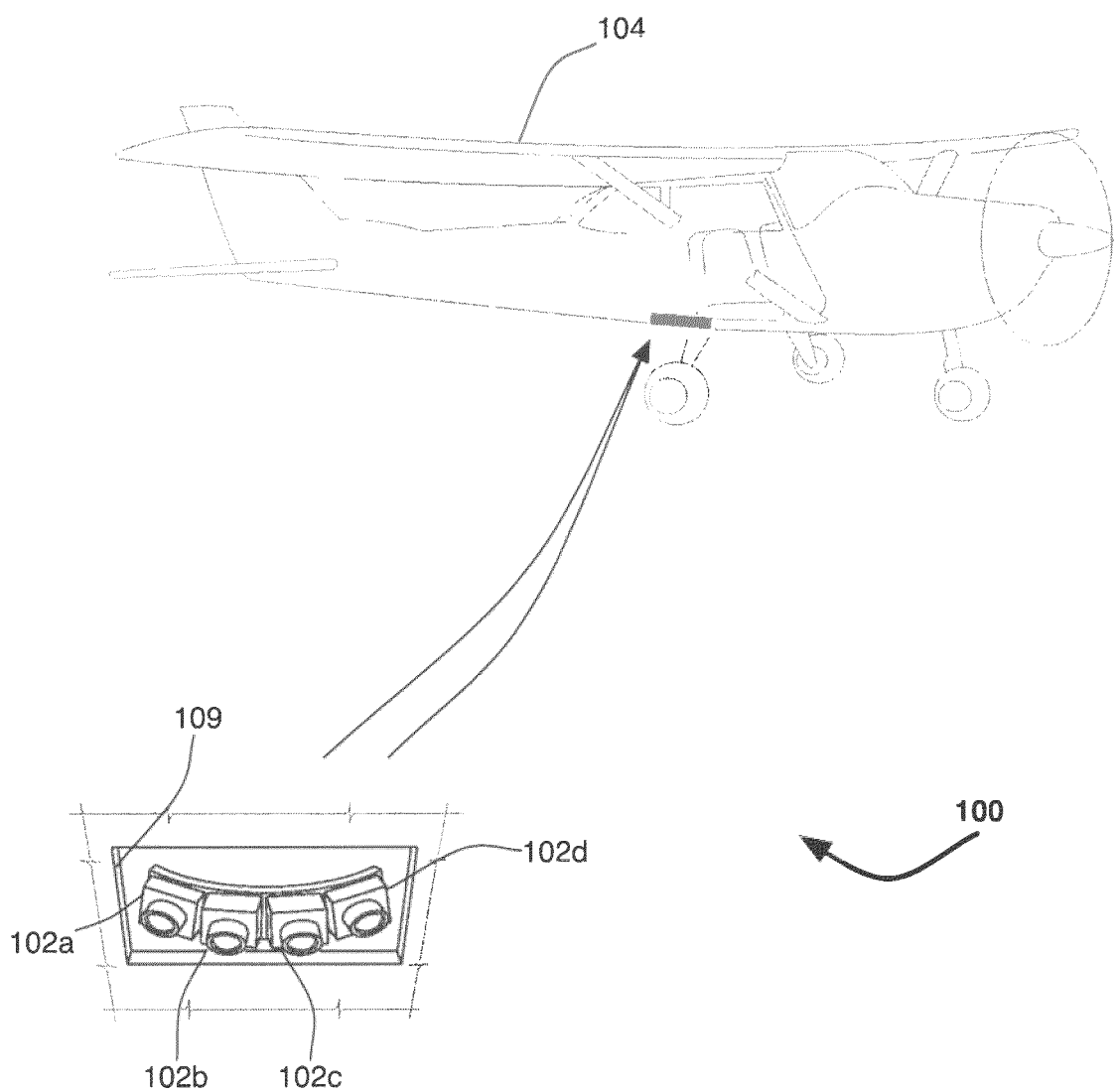
FIG. 1 is a perspective view of an exemplary video frame geo-referencing system constructed in accordance with the present disclosure.

Before explaining at least one embodiment of the invention in detail, it is to be understood that the invention is not limited in its application to the details of construction, experiments, exemplary data, and/or the arrangement of the components set forth in the following description or illustrated in the drawings. The invention is capable of other embodiments or being practiced or carried out in various ways. Also, it is to be understood that the phraseology and terminology employed herein is for purposes of description and should not be regarded as limiting.

The following detailed description refers to the accompanying drawings. The same reference numbers in different drawings may identify the same or similar elements.

As used herein, the terms "comprises", "comprising", includes", "including", "has", "having", or any other variation thereof, are intended to cover a non-exclusive inclusion. For example, a process, method, article, or apparatus that comprises a list of elements is not necessarily limited to only those elements, but may include other elements not expressly listed or inherent to such process, method, article, or apparatus.

As used in the instant disclosure, the terms "provide", "providing", and variations thereof comprise displaying or providing for display a webpage to one or more users interfacing with a computer and/or computer network(s) and/or allowing the one or more user(s) to participate, such as by interacting with one or more mechanisms on a webpage by sending and/or receiving signals (e.g., analog, digital, optical, and/or the like) via a computer network interface (e.g., Ethernet port, TCP/IP post, optical port, cable modem, and/or the like). A user may be provided with a web page in a web browser, or in a software application, for example.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of terms "a" and "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is employed to convey "more than one" unless expressly stated to the contrary.

As used herein, reference to "one embodiment", "an embodiment", "one example", or "an example" means that a particular element, feature, structure, or characteristic described in connection with the embodiment may be included in at least one embodiment. The appearance of the phrase "in one embodiment" or "one example" in various places within the instant specification are not necessarily all referring to the same embodiment or example.

Circuitry, as used herein, may be analog and/or digital, components, or one or more suitably programmed microprocessors and associated hardware and/or software, or hardwired logic. Also, "components" may perform one or more functions. The term "component", may include hardware, such as a processor, an application specific integrated circuit (ASIC), or a field programmable gate array (FPGA), or a combination of hardware and software. Software may include one or more computer executable instructions that when executed by one or more components may cause the component to perform a specified function. It should be understood that the algorithms described herein may be stored on one or more non-transient memory. Exemplary non-transient memory may include random access memory, read only memory, flash memory, and/or the like. Such non-transient memory may be electrically based, optically based, and/or the like.

As used herein, the terms "real-time", "calculating in real-time", "storing in real-time", and similar terms containing "real-time" shall be interpreted to mean completing the process/operation within a certain predetermined time period or number of sequences of completed instructions relating to a certain event and system response. Such time period may vary, but will generally be relatively short. In contrast, the term "non-real-time" may be used to indicate periods of time other than real-time.

As used herein, the terms "full motion video" of "FMV" shall be interpreted to mean digital or analog video comprising a series of video frames which are captured and/or displayed. For example, frame rates may be between approximately seven frames per second (fps) to about thirty fps. In some embodiments, the frame rate may be about twenty-four frames per second (fps). It is to be understood that such frame rates are exemplary only, and should not be construed as limiting in any way. It is to be understood that full motion video may be captured and/or displayed at lower or higher frame rates depending on specific system applications. A system according to the inventive concept disclosed herein may be capable of operating at higher or lower frame rates as will be apparent to a person of ordinary skill in the art presented with the instant disclosure.

As used herein, the term "GIS data", "geographic information system data", "geographical information system data", or "geospatial information system data" shall be interpreted to mean data that may be captured, stored, analyzed, processed, transmitted, and/or otherwise associated with geographical location data. Such GIS data may, for example, be indicative of a geographical location of an object on the Earth's surface, may relate such location to sea level, and/or any other object by using conventional coordinates or monitoring systems (e.g., latitude/longitude, GPS, XYZ coordinates, and/or the like). For example, such GIS data may include, but is not limited to, one or more layers comprising country information, county information, city information, street information, traffic information, quadrant information, location of easements, buildings, pipelines, elevated transmission lines, latitude and longitude, GPS coordinates, elevation relative to sea level, weather information, topographical information, soil information, advertising information, election information, routing information, membership information, and/or other similar information. Such GIS data may be organized, provided, and/or stored as a GIS database or a collection of GIS databases. Databases may include one or more fields for position of the GIS data (e.g., X/Y coordinates, latitude/longitude, and the like), and/or the GIS data itself. In some embodiments, GIS data may be stored in Extensible Markup Language (XML) based KML files (a file format used to display geographic data in a web browser) with one file for each piece of GIS data.

As used herein the term "internal geometry calibration data" may be interpreted to mean data indicative of positions and/or orientations of each pixel of the sensor field of a video frame capture device 102*a-n*. Additionally, internal geometry calibration data may include internal geometry of the sensor field of the video frame capture device 102*a-n*. Such internal geometry calibration data may be calibrated to compensate for any error inherent in and/or due to a video frame capture device 102*a-n*, (e.g., error due to calibrated focal length, sensor size, radial distortion, principal point offset, alignment, and/or the like).

As used herein, the term "marshaling" may be interpreted to mean transforming the memory representation of an object to a data format suitable for analysis by one or more processors. Additionally, "marshaling" may include storing, transmitting, distributing, providing, and/or otherwise communicating the memory representation of an object to one or more processors of a bank of processors. The memory representation of an object may be one or more video frames of a series of video frames. The opposite process may be referred to as de-marshaling or un-marshaling herein.

As used herein, the designation "a-n", "a-d", "a-e", "1-*n*", "1-N", "1-*m*", and other similar designations, whether capitalized or lower-case, are used solely as a convenient shorthand expressions signifying two or more of the elements such designations are appended to. A designation "a-d" may be understood to mean a plurality of the element it is appended to, and is not necessarily limiting of the quantity of four.

As it will be understood by persons of ordinary skill in the art, while the examples of a multi-core processor shown herein may include eight cores, any number of cores may be included in a multi-core processor used with the inventive concept disclosed herein. For example, a multi-core processor may include a bank of processors comprising two, three, four, five, six, seven, ten, one hundred, or a plurality of cores, which may comprise processors, FPGAs, and combinations thereof.

Referring now to the drawings and in particular to FIGS. 1-4, the video frame geo-referencing system 100 may include one or more video frame capture devices 102 mounted in any pattern. For example, in FIGS. 1 and 3, the video frame geo-referencing system 100 includes four video frame capture devices 102*a-d* mounted in a sweep pattern. In the examples depicted in FIGS. 2 and 4, the video frame geo-referencing system 100 includes five video frame capture devices 102*a-e* mounted in a 360° pattern (e.g., video frame capture devices 102*a-e* pointing fore, aft, port, starboard and straight down). It is to be understood, however, that any number of video frame capture devices 102 mounted in any pattern may be used.

The geo-referencing system 100 and/or portions of the geo-referencing system 100 (e.g., the video frame capture devices 102) may be stationary and/or mounted to a moving platform 104. For example, in some embodiments, the video frame geo-referencing system 100 may be mounted to a moving platform 104 as depicted in FIGS. 1-4. The moving platform 104 may be any type of device and/or system capable of movement through space in a predetermined and/or random manner. For example, in FIGS. 1 and 2, the moving platform 104 is shown as an airplane and in FIGS. 3 and 4, the moving platform 104 is shown as an automobile. It should be understood, however, that the moving platform 104 may be implemented in any device and/or system capable of movement through space in a predetermined and/or random manner. For example, the moving platform 104 may be implemented as, but is not limited to, one or more manned or unmanned aerial vehicles, helicopters, trains, automobiles such as vans, ships, boats, four wheelers, snowmobiles, motorcycles, tractors, hot air balloons, helium balloons, orbital vehicles, satellites, submarines, and/or the like. Alternatively, one or more portions of the geo-referencing system 100 may be stationary. For example, one or more video frame capture devices 102 may be mounted on a moving platform 104 while one or more video frame capture devices 102 are mounted on a stationary platform in a fixed location.

Figure 2:
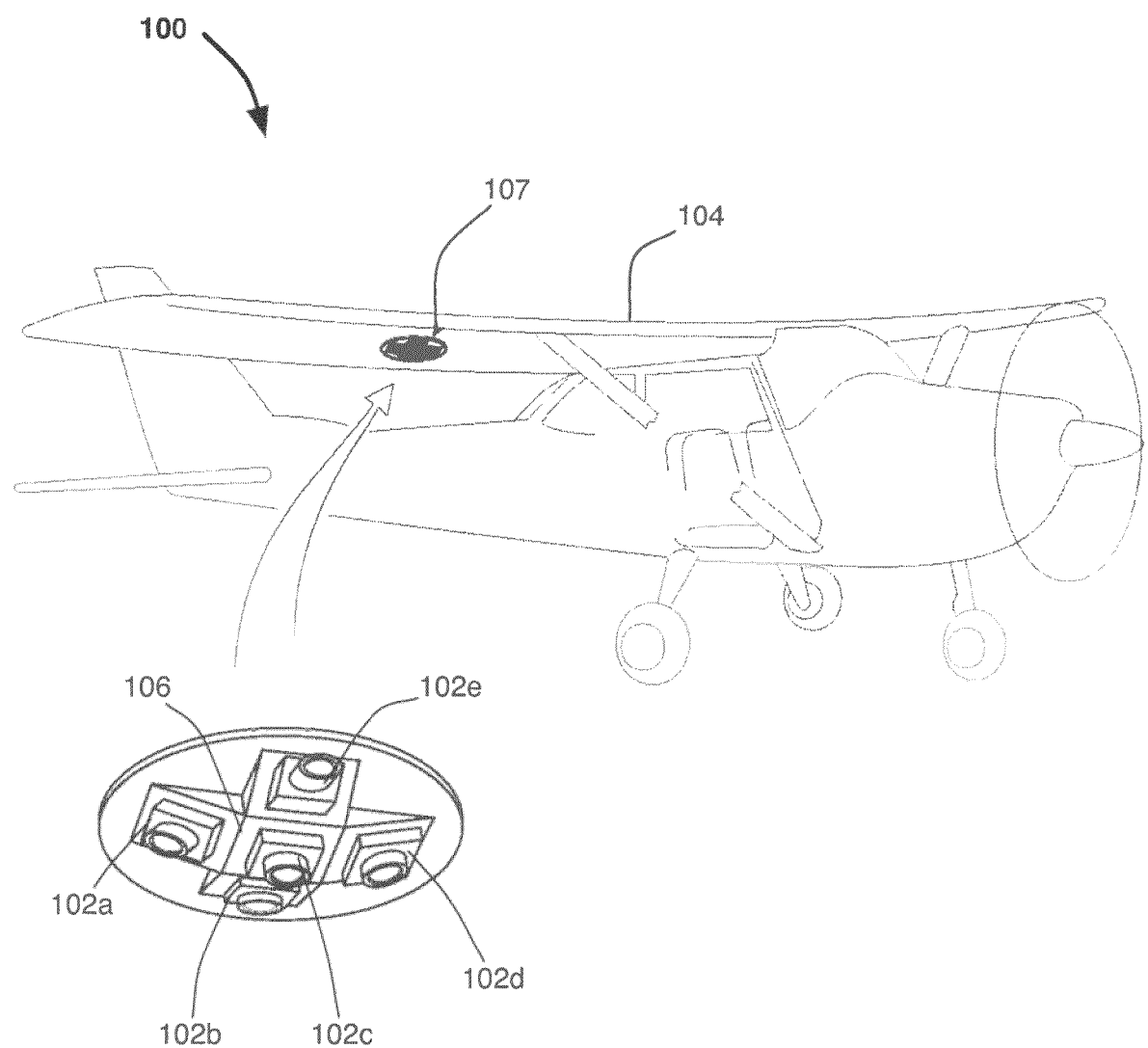
FIG. 2 is a perspective view of another example of a video frame geo-referencing system constructed in accordance with the present disclosure.
Figure 3:
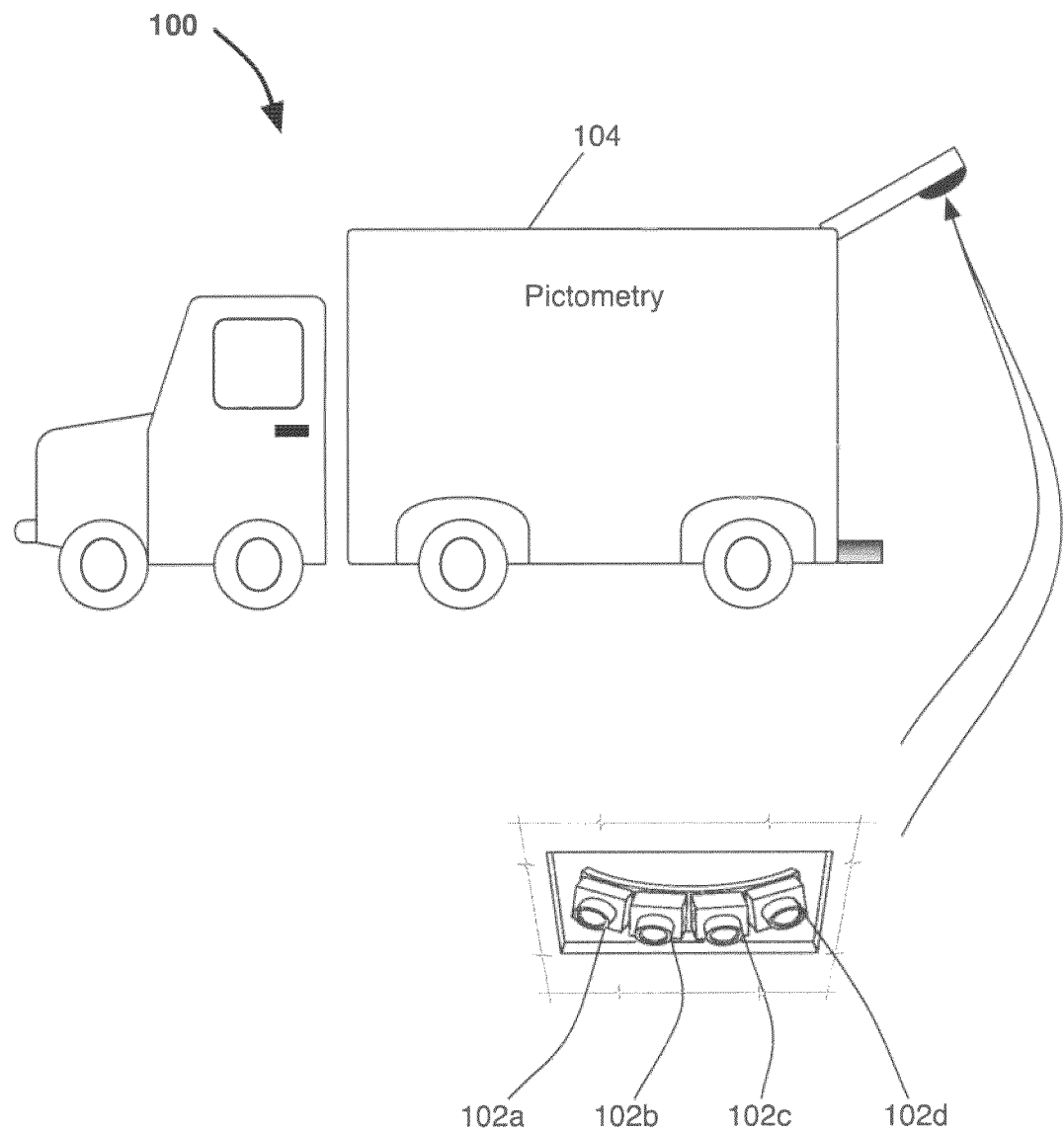
FIG. 3 is a perspective view of yet another example of a video frame geo-referencing system constructed in accordance with the present disclosure.
Figure 4:
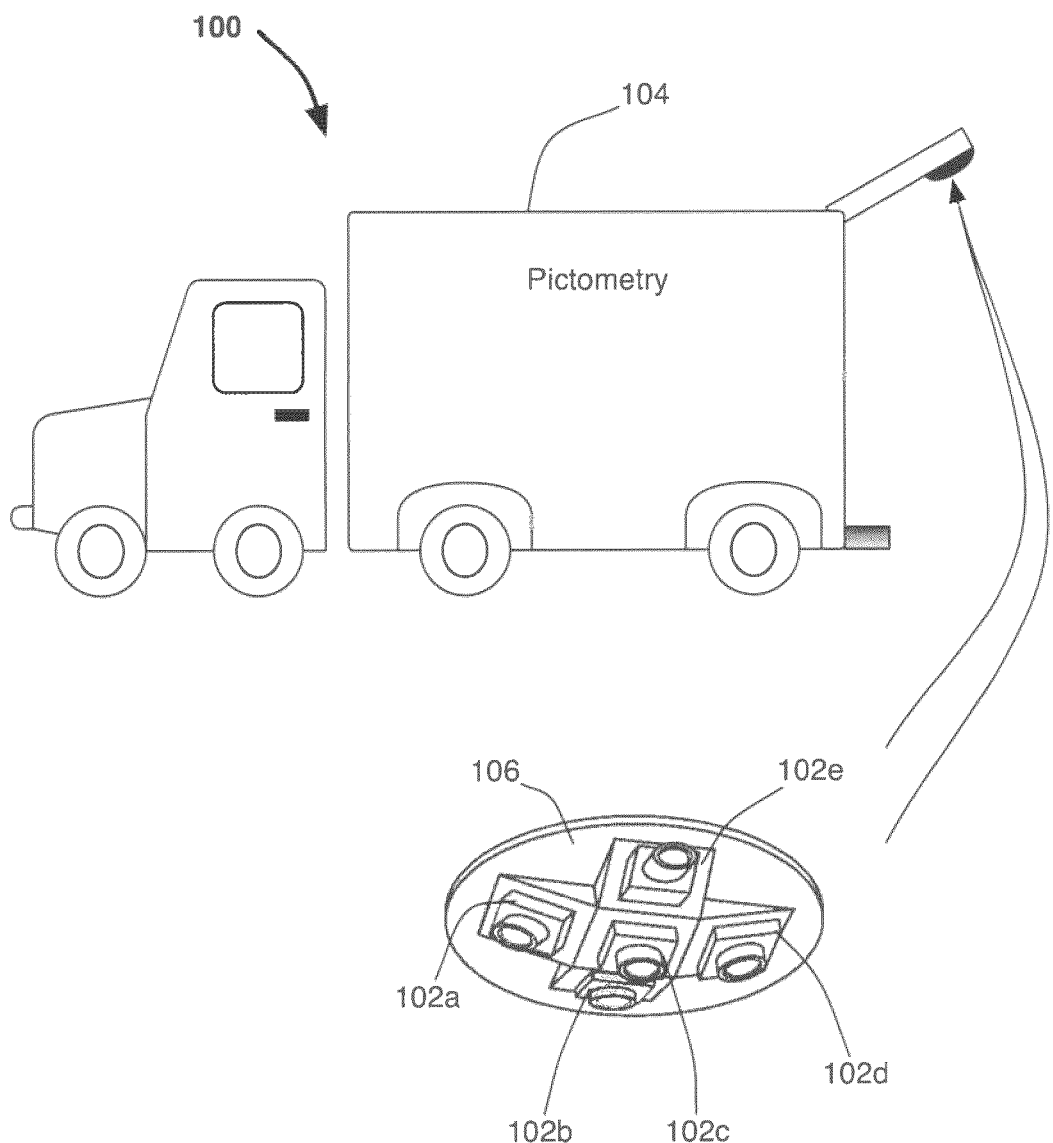
FIG. 4 is a perspective view of yet another example of a video frame geo-referencing system constructed in accordance with the present disclosure.

In some embodiments, the video frame capture devices 102 may be calibrated such that the exact positions and orientations of each of the video frame capture devices 102 are known with respect to at least a portion of the stationary and/or moving platforms 104. For example, as illustrated in FIG. 2, the video frame capture devices 102*a-e* may be mounted onto a common substrate 106. The position of each of the video frame capture devices 102*a-e* may be calibrated with respect to the common substrate 106. The common substrate 106, having the video frame capture devices 102*a-e* mounted thereto, may be then mounted to the moving platform 104.

In some embodiments, the video frame capture devices 102 may be mounted internally to the moving platform 104. FIG. 1 illustrates an exemplary embodiment wherein the video frame capture devices 102*a-d* may be mounted internally to the moving platform 104. In some embodiments, the moving platform 104 may include one or more openings 109 for the video frame capture devices 102*a-d* to sense data through. Alternatively, one or more of the video frame capture devices 102 may be mounted externally to the moving platform 104. For example, in FIG. 2 the video frame capture devices 102*a-e* are shown mounted to an under-wing pod 107 external to the moving platform 104.

Figure 5:
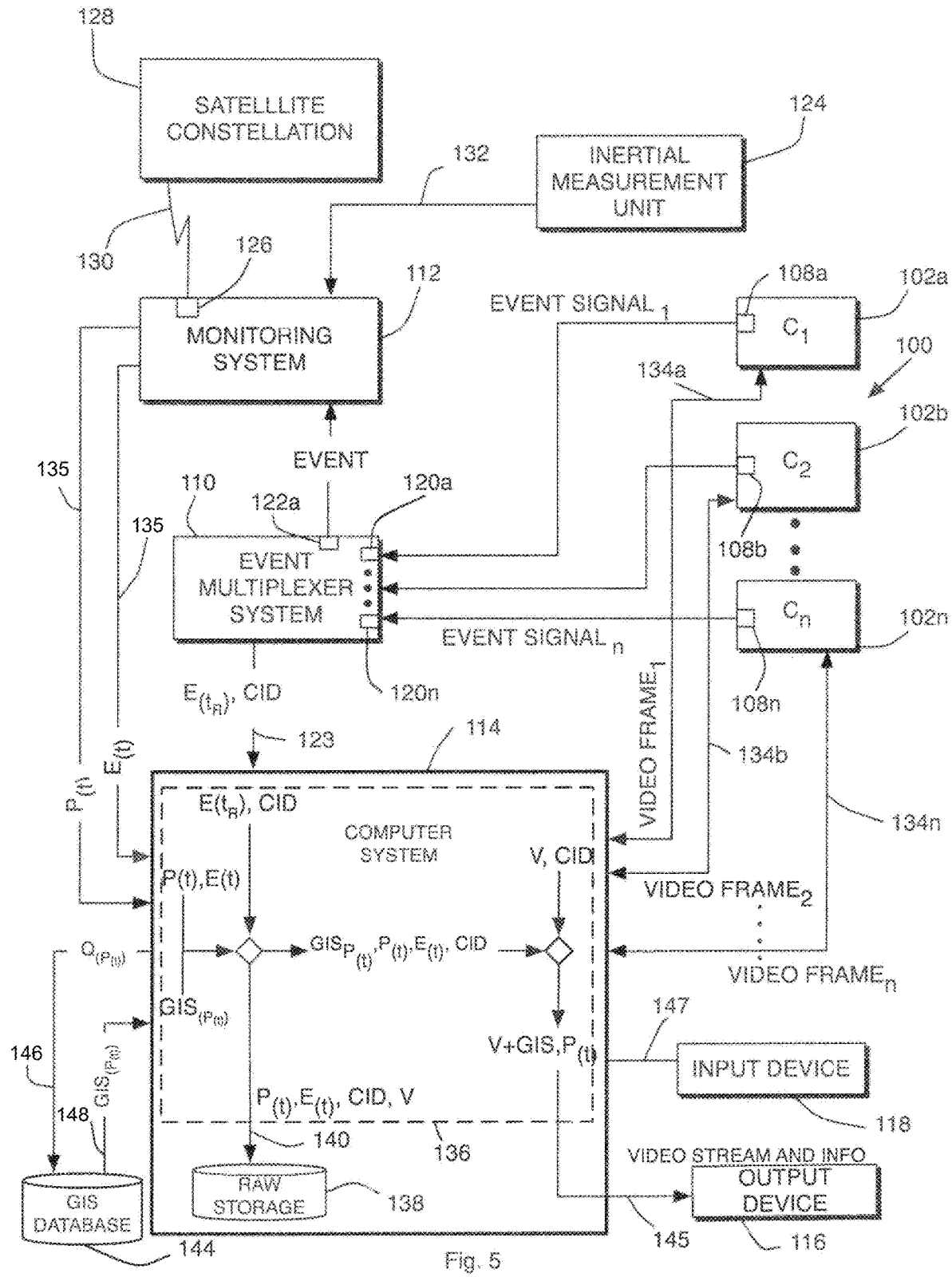
FIG. 5 is a block diagram of an exemplary video frame geo-referencing system constructed in accordance with the present disclosure.

FIG. 5 illustrates a block diagram of the video frame geo-referencing system 100. The video frame geo-referencing system 100 may include one or more video frame capture devices 102*a-n*, one or more event multiplexer systems 110, one or more monitoring systems 112, one or more computer systems 114, one or more output devices 116, and one or more input devices 118.

The video frame geo-referencing system 100 may be used for capturing, processing, and/or providing video imaging. Video imaging may include, but is not limited to, aerial video images, surface-based imaging (e.g., terrestrial-based), water-based imaging, space-based imaging, and/or the like. The video frames used with the instant inventive concept may comprise oblique images, orthogonal images, nadir images, combinations thereof, and/or the like. Such video frames may be captured, processed, and/or provided.

The video frame capture devices 102*a-n* may be included, but are not limited to, analog video cameras, digital video cameras, digital cameras, digital single-lens reflex cameras, electronic image sensors, web cameras, combinations thereof, and/or the like. The video frame capture devices 102*a-n* may be capable of capturing images with varying resolutions. In some embodiments, the video frame capture devices 102*a-n* may be able to detect various wavelengths such as infrared, visible light, and ultraviolet light for example. Generally, each of the video frame capture devices 102*a-n* may be capable of sensing and/or capturing data, such as a series of video frames 1-N. Such video frames may include one or more pixels.

Each of the video frame capture devices 102*a-n* may include one or more event channels 108*a-n*. The event channel may be capable of distributing an event signal indicating the approximate and/or exact time of capture of a video frame by the video frame capture device 102*a-n*. The event channel 108*a-n* may be implemented as any device that transmits a signal coincident with the approximate and/or exact time of capture of a video frame by the video frame capture devices 102*a-n*. For example, the event channel 108*a-n* may include, but is not limited to, devices such as flash outputs, synchronization outputs, intervalometers, and/or the like.

The video frame capture devices 102*a-n* may capture, store, and/or provide one or more series of video frames 1-N having one or more pixels in an analog manner, digital manner, and/or on film. In some embodiments, the video frame capture devices 102*a-n* may be capable of capturing one or more series of video frames 1-N at full motion video frame rates. Video frame capture devices 102*a-n* may capture one or more series of video frames 1-N at rates lower than FMV and/or rates exceeding FMV rates. The video frame capture devices 102*a-n* may be referred to as "camera" or "cameras" herein for the sake of brevity.

The event multiplexer system 110 may include one or more video frame capture inputs 120*a-n* and one or more output ports 122*a-n*. Each video frame capture input 120*a-n* may receive signals from the event channel 108*a-n* of one or more of the video frame capture devices 102*a-n*. The event multiplexer system 110 may output one or more event signals indicative of the approximate time each video frame 1-N was captured. Such event signals may be transmitted by the video frame capture devices 102*a-n*. Additionally, an identification (CID) of each video frame capture devices 102*a-n* may be transmitted via input 120*a-n*.

The monitoring system 112 may record data indicative of the capturing of video frames 1-*n*. For example, the monitoring system 112 may record position data as a function of time, time data, orientation data, and/or any information related to the moving platform 104. In some embodiments, the monitoring system 112 may automatically and/or continuously read and/or record the data. It should be understood, however, that the monitoring system 112 may be capable of reading and/or recording data in other manners. For example, the monitoring system 112 may be capable of reading and/or recording data on a periodic basis, upon receipt of a signal actuating the monitoring system 112, and/or the like. For example, the event signals produced by the event multiplexer system 110 may be transmitted to the monitoring system 112 enabling the monitoring system 112 to read and/or record the data indicative of position as a function of time related to the moving platform 104.

The monitoring system 112 may include one or more processors. For example, the monitoring system 112 may include one or more processes implemented as one or more CPU, one or more microprocessor, one or more FPGA, one or more application-specific integrated circuits, combinations thereof, and/or the like. The monitoring system 112 may receive data indicative of the timing and location of the moving platform 104 during the capture of one or more video frames 1-*n*. For example, the monitoring system 112 may receive data indicative of the timing and location during capture from an inertial measurement unit 124. The monitoring system 112 may store data internally and/or output data to the computer system 114. The monitoring system 112 may output data in any other suitable manner, such as storing such data on an external magnetic, optical storage system, and/or the like.

Position related to the moving platform 104 may include any suitable coordinate system (e.g., XYZ coordinate system). In some embodiments, the monitoring system 112 may include a satellite receiver 126. The receiver 126 may receive monitoring and/or timing signals from the satellite constellation 128. For example, the receiver 126 may receive monitoring and/or timing signals using protocols including, but not limited to, global monitoring satellite (GPS), loran, and/or the like. It should be noted other types of position determining systems may be used including, but not limited to, cell phone triangulation, wireless application protocol, and/or the like. In some embodiments, the receiver 126 may communicate with the satellite constellation 128 via a GPS wireless communication channel 130.

The monitoring system 112 may receive data from the inertial measurement unit 124. Data from the inertial measurement unit 124 may include data associated to the moving platform 104 (e.g., orientation of the moving platform 104). In some embodiments, the inertial measurement unit 124 may include one or more sensors. Sensors may include, but are not limited to, accelerometers, gyroscopes, and/or the like. In some embodiments, sensors may be used to transmit data regarding roll, pitch and/or yaw related to the moving platform 104. The inertial measurement unit 124 may be capable of communicating with the computer system 114 via path 132.

It should be understood that the position and/or orientation information may not necessarily be related to position and/or orientation of the moving platform 104. For example, the position and orientation for each video frame capture device 102a-n may be determined in contrast to determination of position and/or orientation of the moving platform 104. In some embodiments, the position and orientation for each video frame capture device 102a-n may be determined by the monitoring system 112 based upon position and orientation relative to the moving platform 104.

The computer system 114 may receive and record the approximate time wherein each video frame is captured by a video frame capture device 102a-n in relation to the position and orientation of the moving platform 104. For example, approximate time may be determined using a 'shutter open' output of each video frame capture device 102a-n, an event trigger input on the inertial measurement unit 124, event multiplexer 110, monitoring system 112, the computer system 114, and/or the like. In some embodiments, the approximate time may be determined using event trigger inputs on the monitoring system 112. However, in this example, if more video frame capture devices 102a-n are employed than available event trigger inputs on the monitoring system 112, the event multiplexer system 110 may also be used in conjunction to record approximate time. The event multiplexer system 110 may include a number of video frame capture inputs 120a-n equal to or larger than the number of video frame capture devices 102a-n. As such, the event multiplexer system 110 may be used to record approximate time of video frames 1-N captured in relation to the position and orientation of the moving platform 104. Such data may be transmitted to the computer system 114.

The computer system 114 may include one or more processors 136 capable of executing processor executable code, and one or more raw storage 138 capable of storing processor executable code.

The processor 136 may be capable of communicating with the one or more memory 138 via path 140. Additionally, the processor 136 may be capable of communicating with the one or more video frame capture devices 102a-n via paths 134a-n. The processor 136 may be implemented as any processor known in the art such as a microprocessor, a CPU, a FPGA, and combinations thereof. For example, the processor 136 may be implemented as a multi-core processor having a bank of processors as will be described in detail with reference to FIG. 6 below.

The raw storage 138 may be implemented as any conventional non-transient memory such as a hard drive, a flash memory, a random access memory, a solid state drive, and combinations thereof, for example. The raw storage 138 may be local and/or remote with respect to the processor 136. For example, the raw storage 138 may be accessible by the processor 136 via path 140, wherein path 140 may be implemented as a data bus capable of transferring data between the raw storage 138 and the processor 136. The path 140 may be a hardwire connection and/or a network connection.

The processor 136 may store in the raw storage 138 information indicative of the series of video frames 1-N captured by video frame capture devices 102a-n via path 140. The processor 136 may also store information including, but not limited to, the identification, geographical position, orientation, internal geometry calibration data of each of the particular video frame capture devices 102a-n, and/or the like.

The computer system 114 may receive, store and/or provide information indicative of the approximate and/or exact time each video frame 1-N was taken by the video frame capture devices 102a-n, and/or identification of the video frame capture devices 102a-n including the frames 1-N. The computer system 114 may also optionally receive, store and/or provide the video frames 1-N (e.g., from the memory 138) captured by the video frame capture devices 102a-n.

The position related to the moving platform 104 may be transmitted to the computer system 114 by the monitoring system 112 via path 135. The position may be transmitted in any suitable coordinate system including, but not limited to, an X, Y, Z coordinate system, a WGSI984 latitude/longitude coordinate system, and/or the like.

The computer system 114 may be able to communicate with a GIS database 144 via paths 146 and 148. In some embodiments, paths 146 and 148 may be a similar physical path. Paths 146 and 148 may be constructed similarly to paths 134a-n and 140.

The GIS database 144 may be any conventional GIS database 144 that includes GIS data. Additionally, the GIS database 144 may include GIS data containing one layer or multiple layers. In some embodiments, the computer system 114 may communicate with the GIS database 144 in real-time. The GIS database 144 may be implemented at the same location as the computer system 114, i.e. mounted on the moving platform 104. Alternatively, the GIS database 144 may be implemented at a location remote from the location of computer system 114. In some embodiments, the remotely located GIS database 144 may be located in one or more physical locations. For example, the GIS database 144 may communicate with the computer system 114 over a network including, but not limited to, the internet, satellite wireless channels, cellular networks, combinations thereof, and/or the like.

The video frame geo-referencing system 100 may optionally include one or more output devices 116 and one or more input devices 118. The output device 116 may communicate with the computer system 114 via path 145. The input device 118 may communicate with the computer system 114 via path 147. It is to be understood that paths 145 and 147 may be wired and/or non-wired communication channels including, but not limited to, cables, wires, Ethernet, USB ports, Wi-Fi, Bluetooth, Radio Frequency (RF) communication channels, local area networks, wireless Internet, cellular network communication channels, satellite communication channels, infrared ports, combinations thereof and/or the like.

The output device 116 may transmit information from the computer system 114 to a user or another computer system, such that the information may be perceived by the user or other computer system. For example, the output device 116 may include, but is not limited to, implementations such as a computer monitor, a speaker, a printer, a web server, a website, a video player, a "smart" video player, a cell phone, a tablet, a printer, a projector, a laptop monitor, combinations thereof, and/or the like. Information transmitted by the output device 116 may include, but is not limited to, one or more video frames, one or more series of video frames (e.g., outputted at FMV rates), and/or the like. Such information may be provided by the computer system 114 to the output device 116 in real-time.

The input device 118 may transmit data to the computer system 114. Input devices 118 may include, but are not limited to, implementations as touchscreens, keyboards, mouse, cell phones, tablets, PDAs, modems, websites, servers, Ethernet cables, microphones, network adapters, combinations thereof, and/or the like, for example. The input devices 118 may be located in the same physical location as the computer system 114, may be remotely located, and/or partially or completely network-based. It is to be understood that the output device 116 and the input device 118 may be integrated in a single device such as a touchscreen tablet, a cellular phone, a website, a server, a laptop, and combinations thereof, for example.

Figure 6:
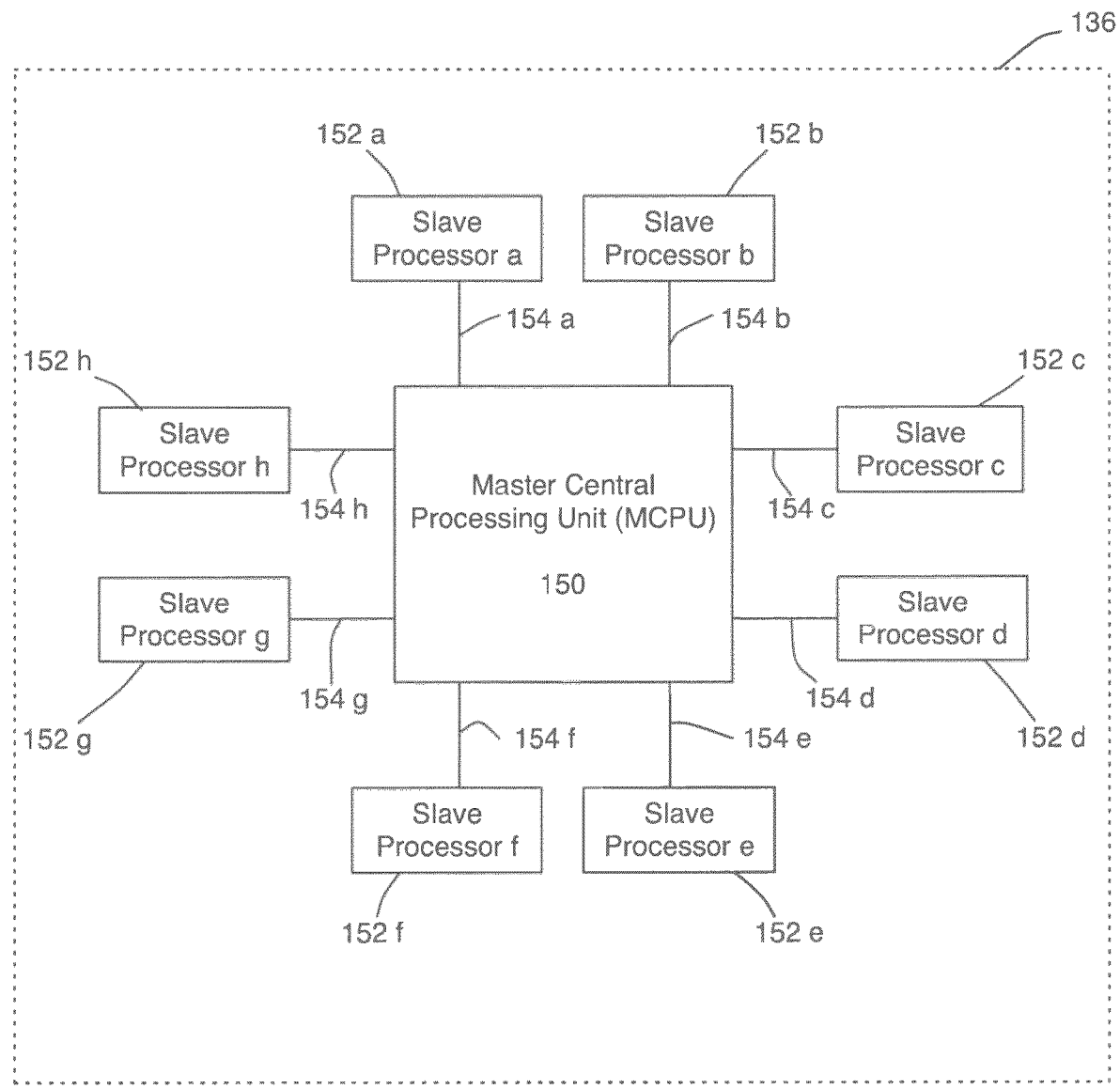
FIG. 6 is a diagrammatic view of exemplary multi-processor architecture of a system constructed in accordance with the present disclosure.

Referring now to FIG. 6, shown therein is an exemplary embodiment of the processor 136 used in the computer system 114 according to the present disclosure. The processor 136 may include a master central processing unit (MCPU) 150, and one or more slave processors 152*a-n*. It is to be understood that while eight processors 152*a-n* are shown in FIG. 6, any number of processors may be used with the inventive concept disclosed herein. For example, in some embodiments, a single slave processor 152 may be used.

The MCPU 150 may be implemented as any conventional processor capable of executing processor executable code such as a microprocessor, a CPU, a FPGA, or combinations thereof. The MCPU 150 is capable of communicating with the one or more slave processors 152*a-n* via paths 154*a-n*, which may be implemented as any conventional databus capable of transferring data between the MCPU 150 and the slave processors 152*a-n*. The MCPU 150 and the slave processors 152*a-n* may be located in the same physical location, may be remotely located, and/or partially or completely network-based. Additionally, each slave processor 152*a-n* may be located in the same physical location as other slave processors, may be remotely located, and/or partially or completely network-based.

The one or more slave processors 152*a-n* may be referred to herein after as a "bank of processors." The slave processors 152*a-n* may be implemented similarly to the MCPU 150. The function of the MCPU 150 and the slave processors 152*a-n* will be described below.

Figure 7:
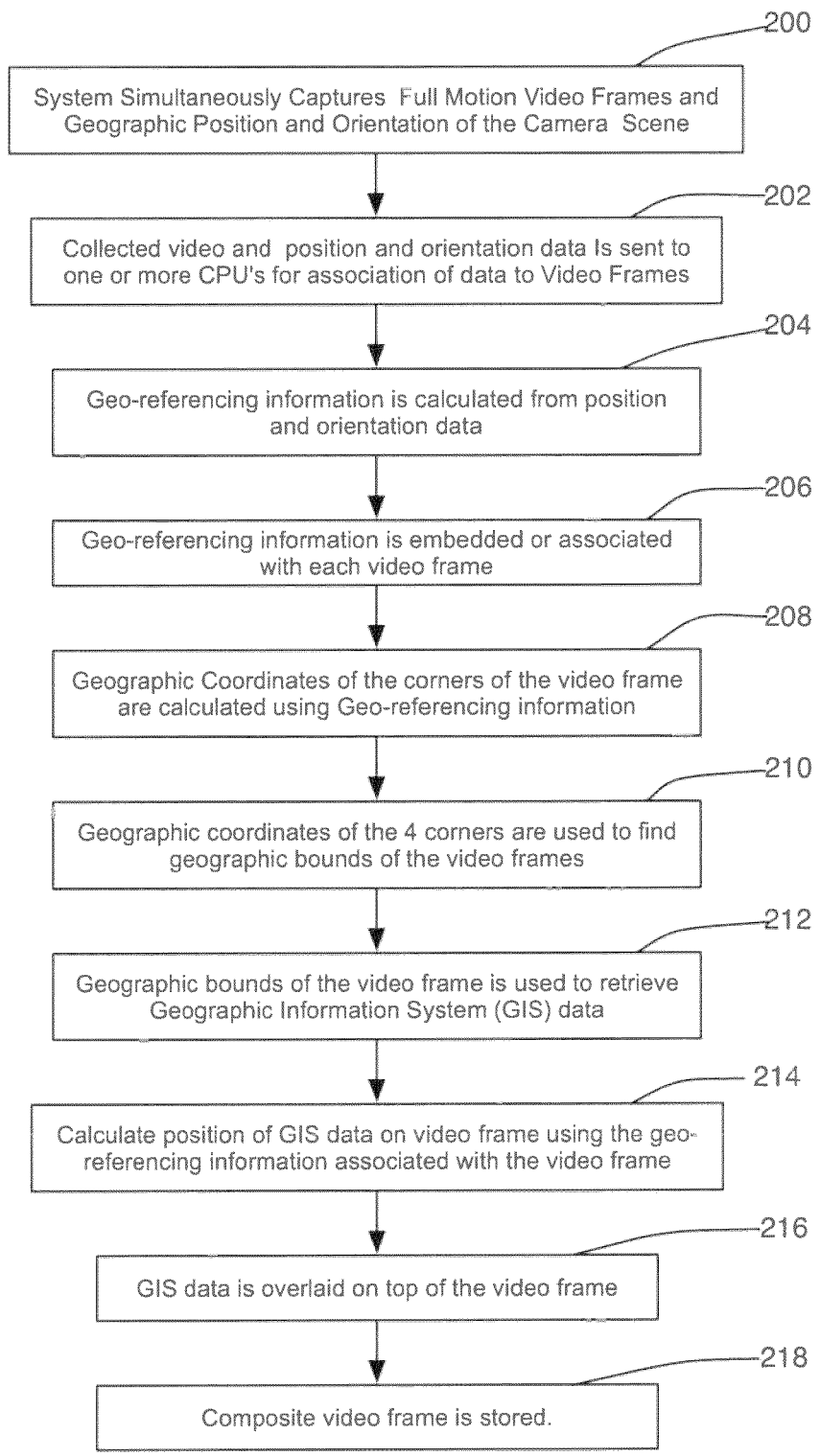
FIG. 7 is a block diagram of an exemplary logic flow of a system constructed in accordance with the present disclosure.

FIG. 7 illustrates a flow chart of an exemplary embodiment of a method for operating the video frame geo-referencing system 100 according to the instant disclosure. In a step 200, the moving platform 104 may be actuated and the video frame geo-referencing system 100 may begin to capture one or more series of video frames 1-N. For example, the video frame geo-referencing system 100 may begin to capture one or more series of video frames 1-N at FMV rates with the video frame capture devices 102*a-n*. In some embodiments, each series of video frames 1-N may be captured with one of the video frame capture devices 102*a-n*. Additionally, information regarding the approximate and/or exact time each video frame 1-N may be captured and transmitted to the computer system 114. For example, if the video frame geo-referencing system 100 includes four video frame capture devices 102*a-d*, then four series of video frames 1-4 may be captured simultaneously. In some embodiments, the video frame capture devices 102*a-n* may be independently controlled by software running on the computer system 114.

The series of video frames 1-N may be transmitted to the computer system 114, and may be stored in the raw storage 138. The monitoring system 112 may collect position and orientation data of the moving platform 104 while the series of video frames 1-N are captured. The position and orientation data may be transmitted to the computer system 114. The computer system 114 may store the position and orientation data in the memory 138. Alternatively, the series of video frames 1-N and/or position and orientation data may be stored on any non-transient memory accessible by the computer system 114. For example, the series of video frames 1-N and/or position and orientation data may be stored as a local memory of the video frame capture devices 102*a-n*, local memory of the monitoring system 112, and/or the like. In some embodiments, the location and timing of the capturing of the series of video frames 1-N may be pre-determined.

In a step 202, the computer system 114 may transmit the collected series of video frames 1-N, timing data for each video frame 1-N, position and orientation data of the moving platform 104, and/or calibration data for each video frame capture device 102*a-n* to the processor 136 for association of such data with video frames 1-N.

In a step 204, the processor 136 may utilize the geographic position data, the orientation data, and/or the interior calibration data, to determine geo-referencing information for each of the video frames 1-N. Geo-referencing may determine the location of each pixel from the rows/columns of pixels comprising the video frames 1-N. In some embodiments, the processor 136 may marshal one or more video frame to one or more of the slave processors 152*a-n* as will be described with reference to FIGS. 8-9 below.

In a step 206, the processor 136 may overlay, embed, or otherwise associate the geo-referencing information determined in step 204 with each video frame 1-N from the series of video frames 1-N.

In a step 208, points indicative of the boundary of the video frames 1-*n* may be determined. For example, the geographic coordinates of the four corners of the video frames 1-N may be determined by the processor 136. In some embodiments, the geographic coordinates of the four corners of the video frames 1-N may be determined using the geo-referencing information determined in step 206.

In a step 210, the processor 136 uses the geographic coordinates of the points (e.g., four corners of the video frames 1-N) to find the geographic bounds of the video frames 1-N. In a step 212, the geographic bounds of each video frame 1-N (e.g., one or more pixels within the video frame) may be used to retrieve one or more layers of GIS data from the GIS database 144 for each video frame 1-N.

In a step 214, the geo-referencing information associated with each video frame 1-N may be used to determine the position of the GIS data on the particular video frame 1-N. In some embodiments, determine of the position of the GIS data may include marshaling one or more video frames 1-N to one or more of the slave processors 152*a-n* of the bank of processors 152*a-n* as will be described with reference to FIGS. 8-9.

In some embodiments, each geographic point location from the GIS data may be translated from geographic coordinates (e.g., latitude/longitude or X/Y) to video frame coordinates (e.g., pixel row/column) using the geo-referencing information associated with the video frame.

In some embodiments, the geo-referencing information associated with a single video frame may be used to determine position of another video frame. For example, the geo-referencing information associated with a single video frame 1 may be used to determine the position of GIS data for video frame 1. Then for video frame 2, the precise position of the center (or any other corresponding part) of video frame 2 may be determined. The GIS data position determined for video frame 1 may then be shifted by an offset between the determined center positions of video frame 1 to video frame 2. The offset may be used to determine the position of GIS data for video frame 2. This process may be repeated for one or more additional video frames 3-N.

In another example, the processor 136 may determine GIS data position for a single video frame and shift positions of a set of frames based on the single frame. For example, the processor 136 may determine GIS data position for video frame 1, and shift such positions according to the offset of video frames 2-9. Then, the processor 136 may determine GIS data position for video frame 10, and shift such positions according to the offset of video frames 11-19. The GIS data positions for the remaining video frames 20-N may be determined in a similar fashion.

In some embodiments, the processor 136 may calculate GIS data position for a single video frame and shift positions of tangential frames. For example, the processor 136 may determine GIS data position for video frame 1, and shift such positions according to the offset of video frame 2. Then, the processor 136 may determine GIS data position for video frame 3, and shift such positions according to the offset of video frame 4. The GIS data positions for the remaining video frames 5-N may be determined in a similar fashion.

As it will be readily understood by a person of ordinary skill in the art, the ratio of video frames 1-N for which the GIS data positions are determined to video frames 1-N for which the position is determined by the offset shift may be varied depending on processor 136 capabilities and configuration, as well as quality and resolution of the video frames 1-N and layers of GIS data overlaid on such video frames 1-N.

In a step 216, the GIS data may be overlaid onto video frames 1-N at the positions calculated in step 214. Such video frames 1-N containing overlaid GIS data will be referred to as composite video frames 1-M. Alternatively, GIS data may be associated with video frames 1-N rather than overlaying GIS data on video frames 1-N. For example, a "smart" player capable of overlaying the associated GIS data to an appropriate composite video frame 1-M may be used to overlay the GIS data over the series of composite video frames 1-M at a later time. In some embodiments, the smart player may be capable of overlaying one or more GIS data layers onto composite video frames 1-M in response to user preferences.

One or more layers of GIS data may be overlaid onto composite video frames 1-M. Additionally, one or more layers of GIS data may be associated with the composite video frames 1-M. Overlaid GIS data and/or associated GIS data may allow the output device 116 to output the one or more overlaid layers of GIS data when outputting the composite video frames 1-N. As such, a user may be able to selectively display the one or more associated layers of GIS data onto the composite video frames 1-M.

In a step 218, the composite video frames 1-M may be assembled into a FMV stream of composite video frames 1-M, stored into memory 138, and/or provided in real-time. Alternatively, the composite video frames 1-M may be stored in a removable memory device such as a CD, a DVD, a Blue-Ray, a flash drive, a hard drive, or solid state drive, for example. The composite video frames 1-M may be stored separately from the video frames 1-N, the composite video frames 1-M may replace the video frames 1-N, or alternatively, the composite video frames 1-M may be stored over the video frames 1-N. The composite video frames 1-M may be transmitted to the output device 116 in real-time, and may be transmitted to remote output devices over a network such as the internet, a cellular network, or a satellite communication network, for example.

Figure 8:
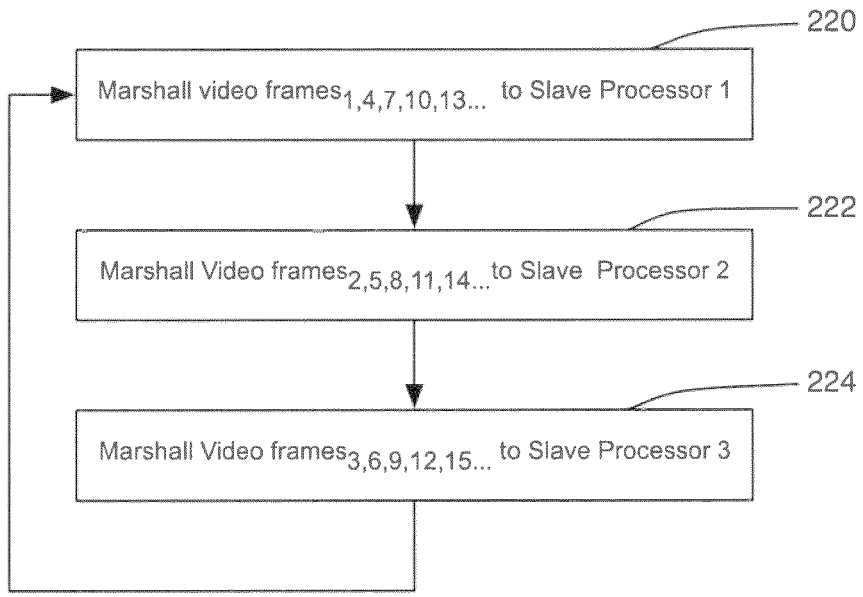
FIG. 8 is a block diagram of exemplary marshaling steps of a system constructed in accordance with the present disclosure.

FIG. 8 illustrates an exemplary embodiment of a method for marshaling video frames to processors. Generally, video frames 1-N may be marshaled to the slave processors 152*a-n*. For example, in a step 220 video frame 1 may be marshaled to slave processor 152*a*. In a step 222, video frame 2 may be marshaled to slave processor 152*b*. Similarly, video frame 3 may be marshaled to slave processor 152*c* in a step 224. The remaining video frames 4-N in the series of video frames 1-N may be marshaled to slave processors 152*a-n* in a similar fashion until all video frames from the series 1-N are marshaled to one or more slave processors 152*a-n*. For example, if there are 15 video frames to be marshaled, then video frames 1, 4, 7, 10, and 13 may be marshaled to slave processor 152*a*; video frames 2, 5, 8, 11, and 14 may be marshaled to slave processor 152*b*; and video frames 3, 6, 9, 12, and 15 may be marshaled to slave processor 152*c* in a round-robin fashion.

Figure 9:
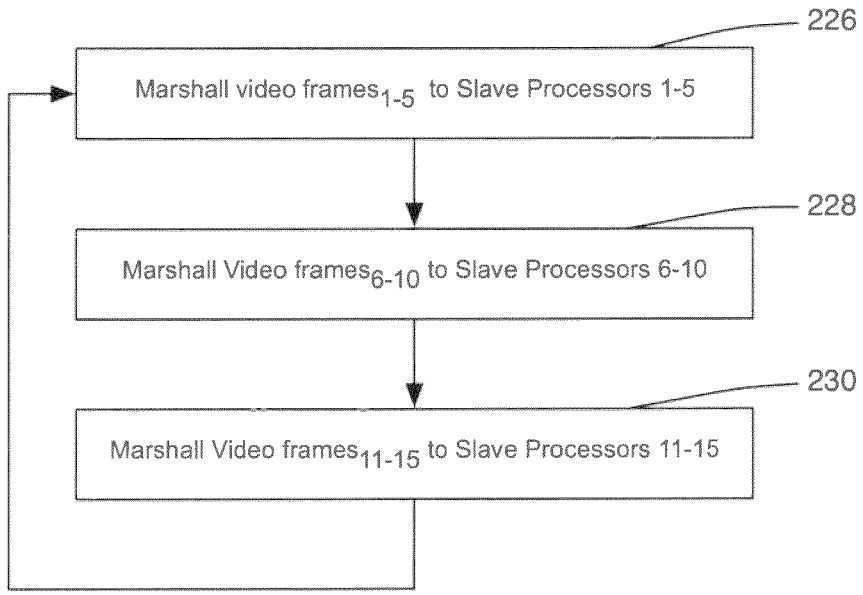
FIG. 9 is a block diagram of another embodiment of exemplary marshaling steps of a system constructed in accordance with the present disclosure.
Figure 10:
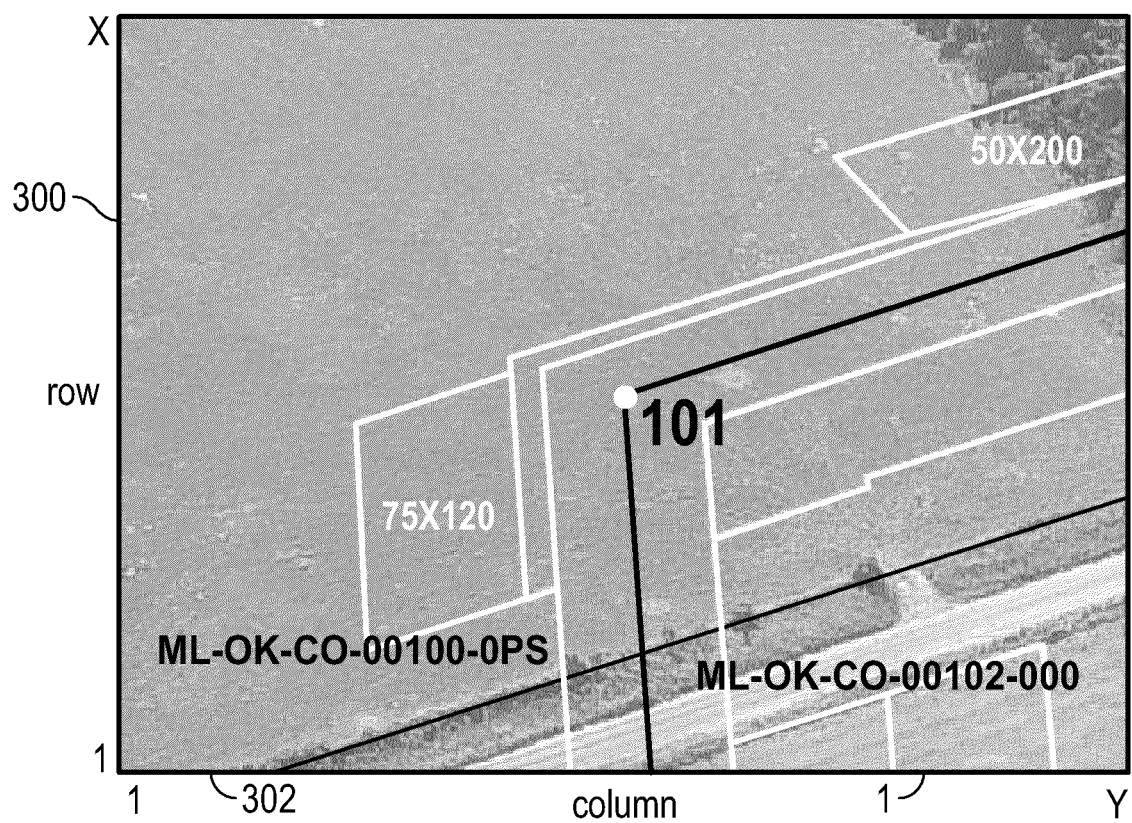
FIGS. 10-18 are exemplary composite video frames 1-9 from a series of video frames 1-N according to the instant disclosure.
Figure 11:
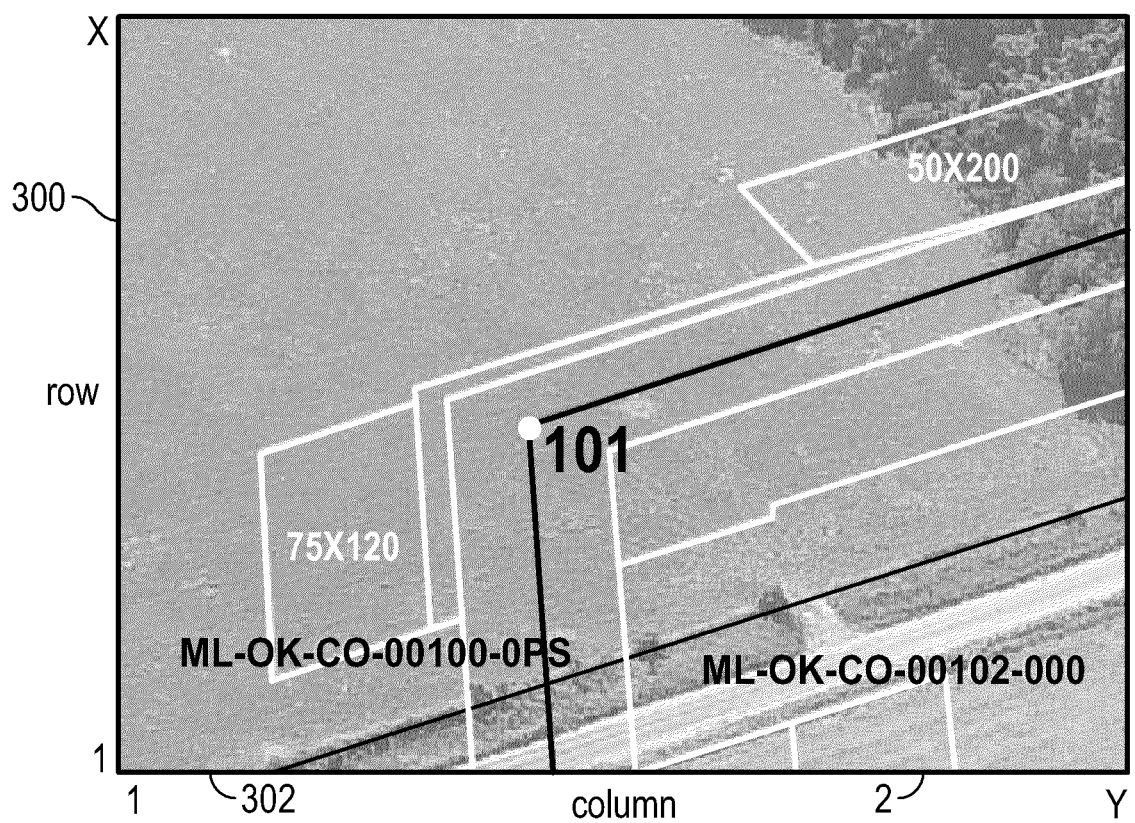
Figure 12:
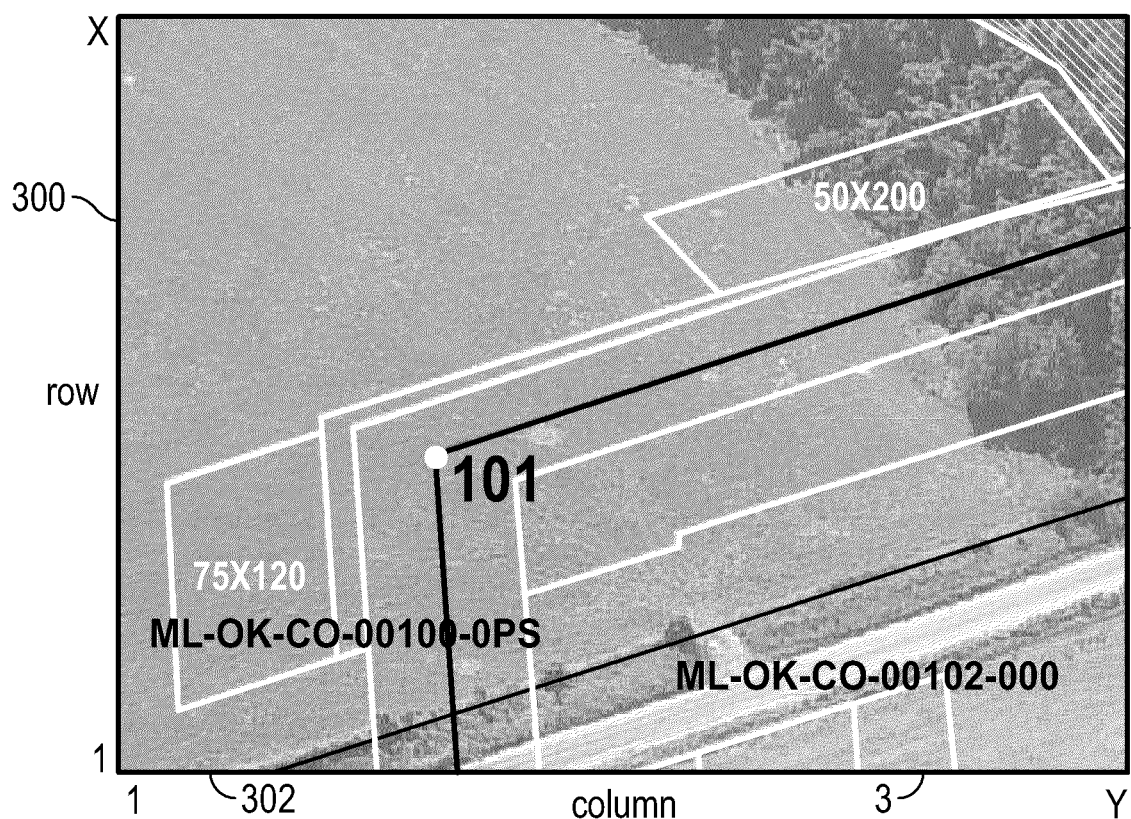
Figure 13:
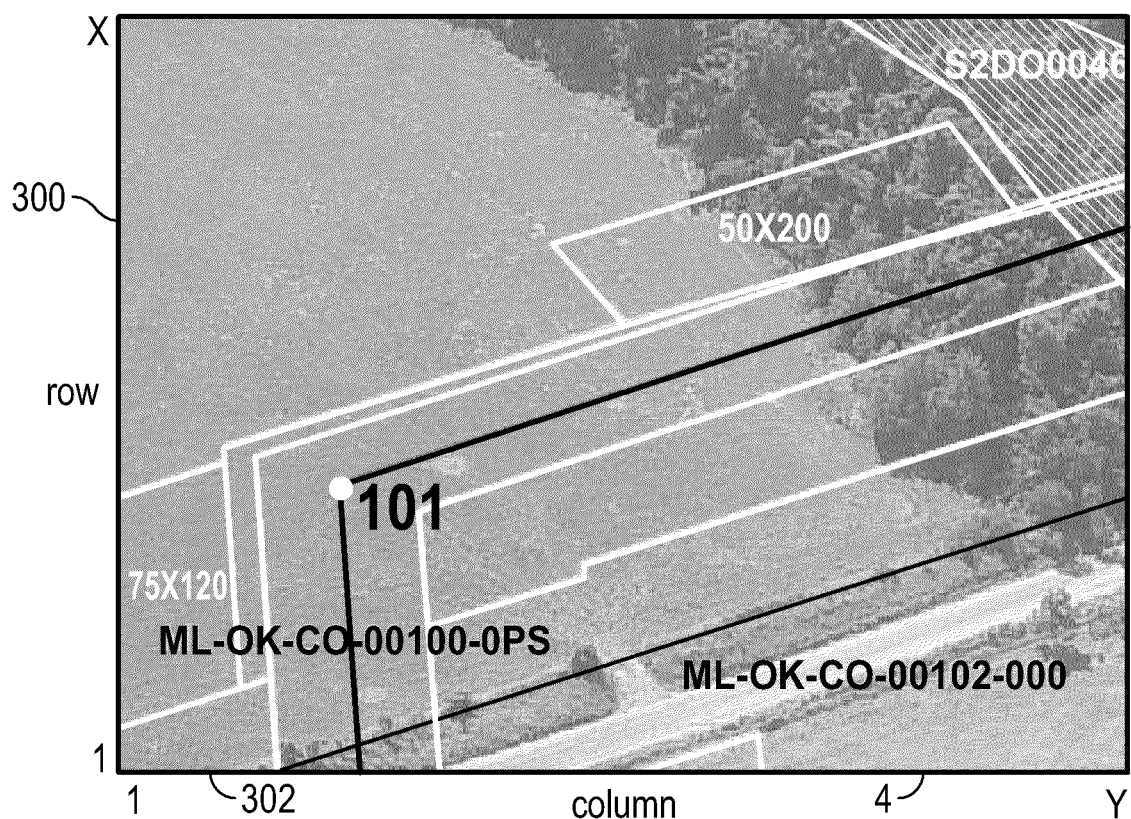
Figure 14:
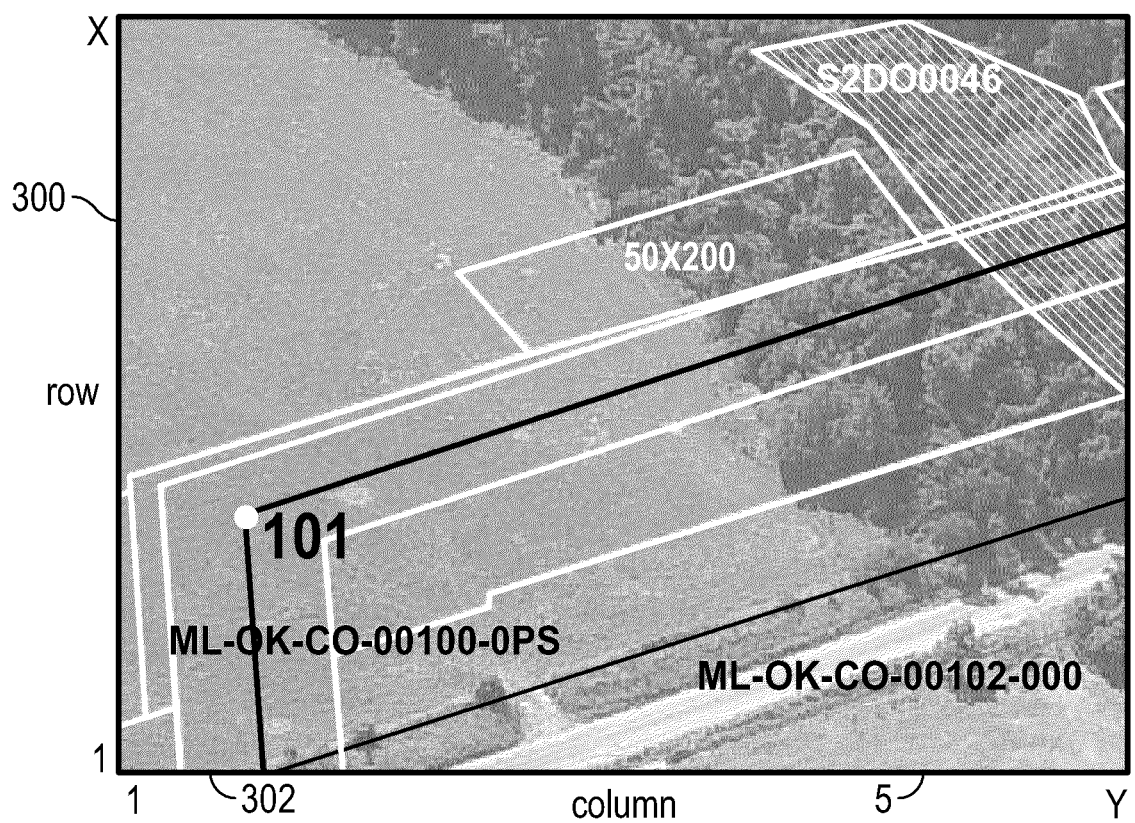
Figure 15:
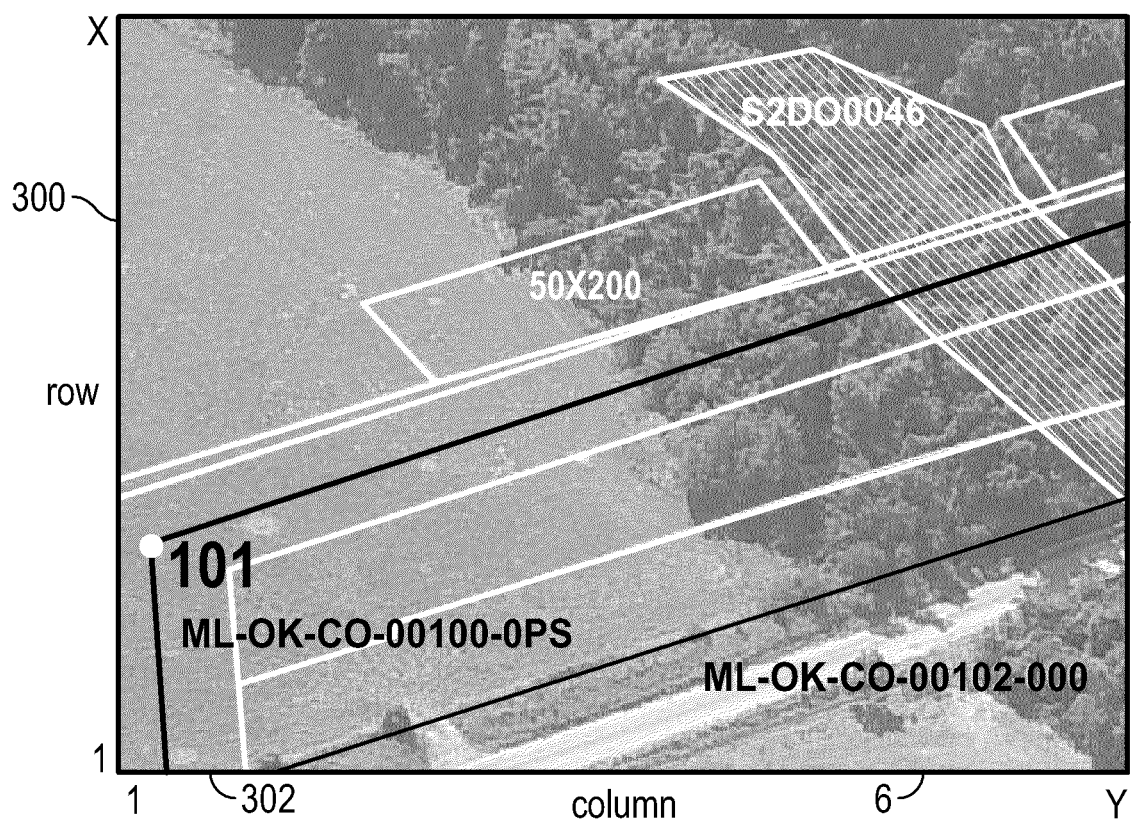
Figure 16:
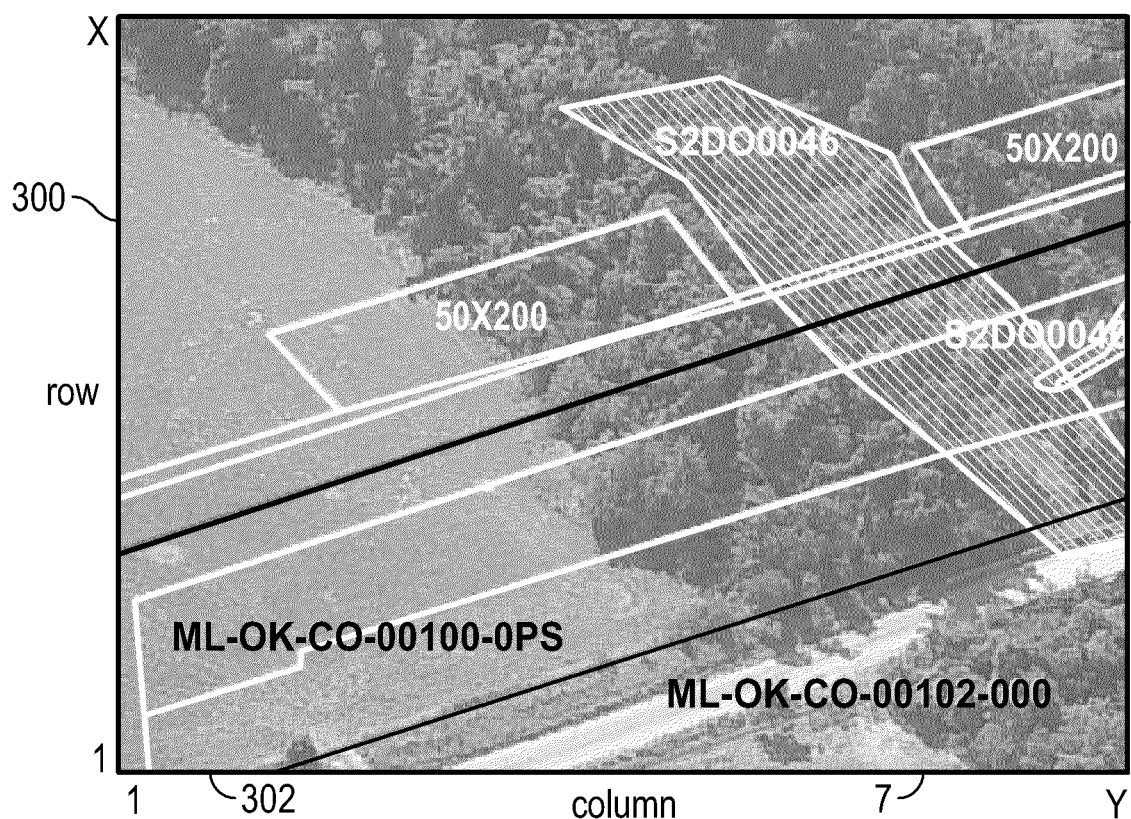
Figure 17:
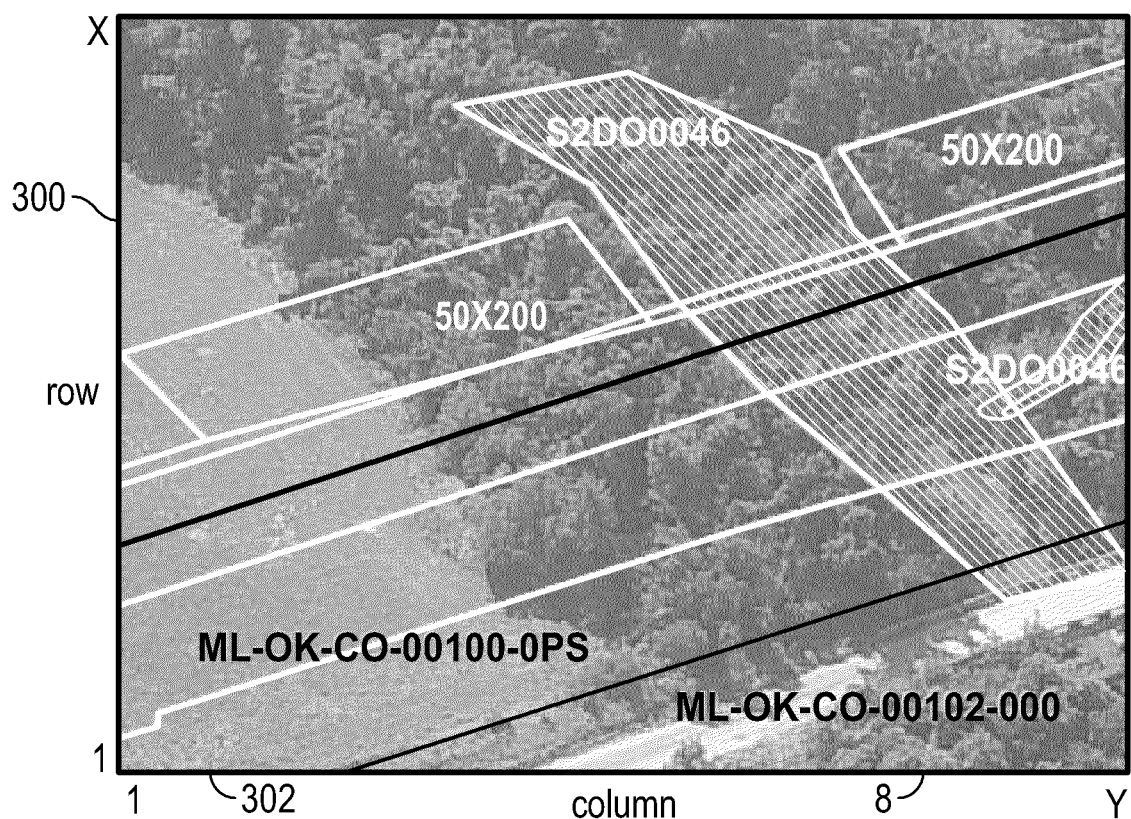
Figure 18:
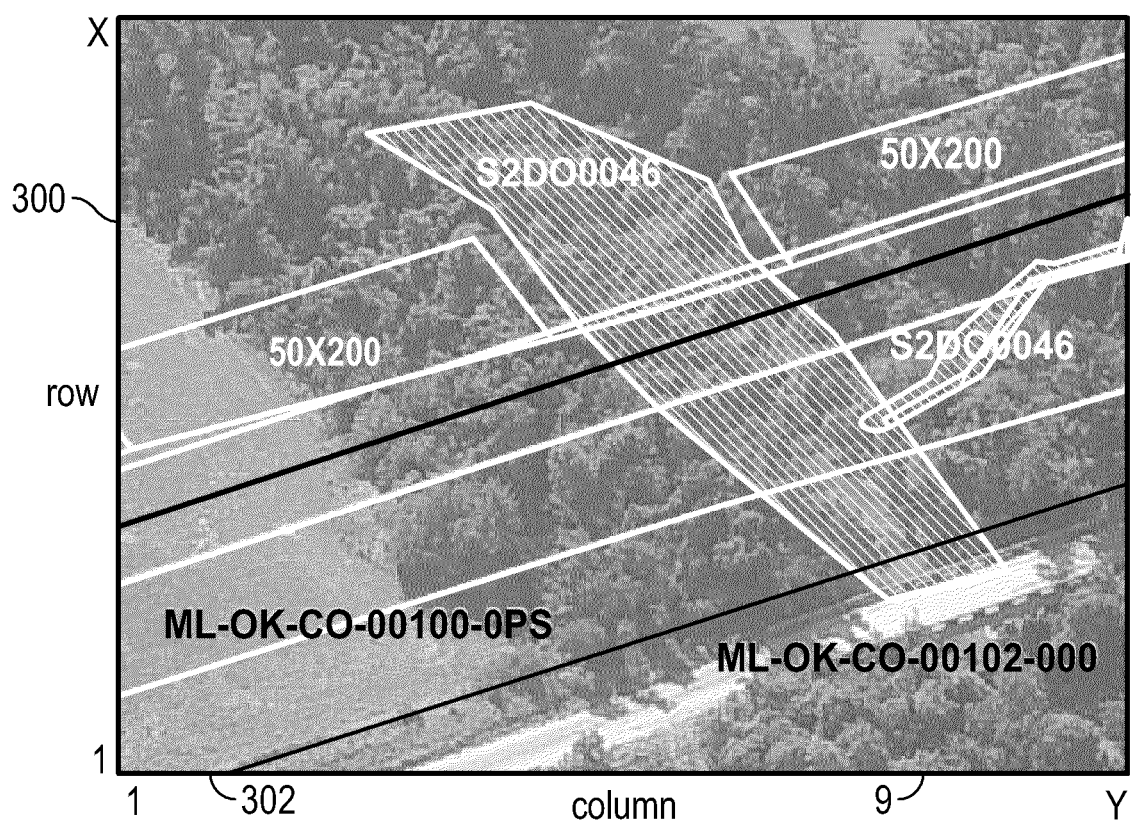
Figure 19:
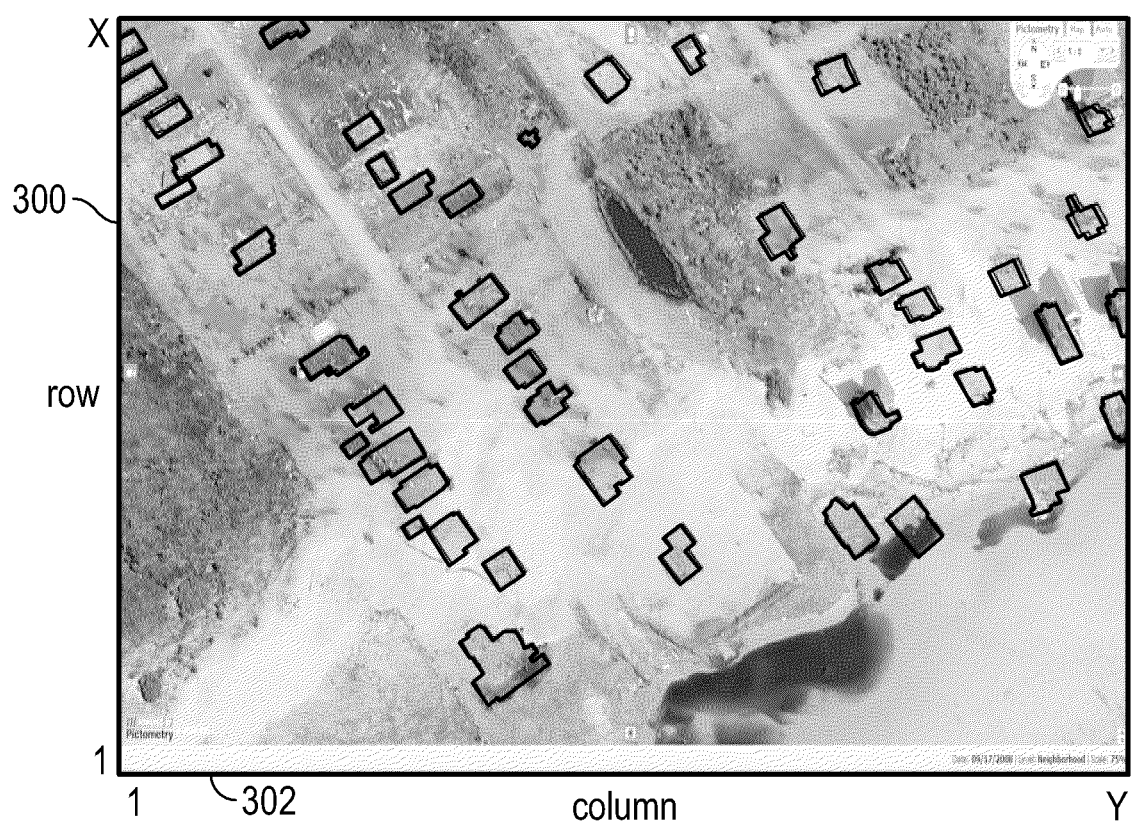
FIG. 19 is another exemplary composite video frame according to the instant disclosure showing overlaid GIS data of residential home foundations.

FIG. 9 illustrates another exemplary embodiment of a method for marshaling video frames to processors. Generally, each video frame is marshaled to a separate processor. For example, in a step 226, the MCPU 150 may marshal video frames 1-5 to slave processors 152*a-e*, with video frame 1 being marshaled to slave processor 152*a*, video frame 2 being marshaled to slave processor 152*b*, video frame 3 being marshaled to slave processor 152*c*, video frame 4 being marshaled to slave processor 152*d*, and video frame 5 being marshaled to slave processor 152*e*. In a step 228, video frames 6-10 may be marshaled to slave processors 152*e-h* in a similar fashion. Next, in a step 230, video frames 11-15 may be marshaled to slave processors 152*i-m* in a similar fashion.

It is to be understood that video frames 1-N may be marshaled to the bank of slave processors 152*a-n* in other ways depending on the number of video frames 1-N and slave processors 152*a-n*, for example. It is to also be understood that a combination of the methods shown in FIGS. 8 and 9 may be used to marshal video frames 1-N to the slave processors 152*a-n*.

Referring now to FIGS. 10-18, shown therein are a series of composite video frames 1-M according to the instant disclosure. The composite video frame series 1-M may include a plurality of rows 1-*x* and a plurality of columns 1-*y*. The composite video frames 1-M may include image data 300 in the form of pixels with GIS data 302 replacing the pixels of the image data. The composite video frames 1-M may display one or more layers of GIS data, such as for example dimensions of a portion of a composite video frame 1-M, coordinates of an object shown in a composite video frame 1-M, and/or county and quadrant of a portion of a composite video frame 1-M. As shown in FIGS. 10-18, the GIS data 302 is moving in a single direction as different geographical areas are captured within the image data 300 of the composite video frames 1-M. It is to be understood that other layers of GIS data may be overlaid on the composite video frames 1-M such as elevation, latitude and longitude, street names, business locations, country information, traffic information, weather information, and city information, for example, as will be understood by a person of ordinary skill in the art presented with the instant disclosure.

In operation, the video frame geo-referencing system may actuate the moving platform 104 to begin moving through space. In some embodiments, a user of the video frame geo-referencing system 100 may actuate the moving platform 104 to begin moving through space. One or more of the video frame capture devices 102*a-n* may initiate capture of video frames 1-N. In some embodiments, the video frames 1-N may be representative of a pre-determined geographic area. The video frame geo-referencing system 100 may use data from the positional system and internal calibration data to geo-reference the series of video frames 1-N. The geographical boundary of the video frames 1-N may be determined. The video frame geo-referencing system 100 may use the determined geographical boundary of the series of video frames 1-N to obtain one or more layers of GIS data from the GIS database 144. In some embodiments, the one or more layers of GIS data to be obtained may be specified by the user via the input device 118. The video frame geo-referencing system overlays one or more layers of GIS data over one or more frames of the series of video frames 1-N to create a series of composite video frames 1-M.

In some embodiments, the user may select one or more layers of GIS data to be overlaid onto the series of video frames 1-N in order to create the series of composite video frames 1-M. The user may optionally cause the video frame geo-referencing system 100 to store the series of composite frames 1-M separately from the series of video frames 1-N, or to replace the series of video frames 1-N with a corresponding series of composite video frames 1-M.

The video frame geo-referencing system 100 may provide one or more composite video frame, or series of composite video frames 1-M to one or more output devices 116. For example, the series of composite video frames 1-M may be in the form of full motion video.

Optionally, a series of composite video frames 1-M and video frames 1-N can be interleaved and provided to the one or more output device 116. In this instance, the video frame geo-referencing system 100 may not have to geo-reference and overlay GIS data onto as many video frames. However, flicker may be introduced in this embodiment.

In some embodiments, the user may optionally select one or more additional layers of GIS data to be displayed on the composite video frames 1-M via the input device 118. Additionally, the user may select one or more layers of GIS data to be removed from the displayed composite video frames 1-M.

It will be understood from the foregoing description that various modifications and changes may be made in the preferred and alternative embodiments of the present invention without departing from its true spirit.

What is claimed is:

1. A method, comprising the steps of:
   capturing one or more video frames of a geographic area with one or more video capture devices, the video frames having pixels;
   associating, with one or more computer processors, geographic position data and orientation data of the one or more video capture devices with the two or more video frames;
   analyzing, with the one or more computer processors, the geographic position data and orientation data and the video frames to generate geo-referencing data for pixels of the video frames, wherein the geo-referencing data comprises geographic locations of pixels of the video frames;
   determining, with the one or more computer processors, geographical boundaries of the video frames from the geo-referencing data, based at least in part on geographic coordinates of corners of the video frames, which are based on the geo-referencing data for pixels of the video frames;
   receiving, by the one or more computer processors, one or more layers of geographic information system (GIS) data using the determined geographical boundaries of the video frame;
   determining, with the one or more computer processors, overlay position of the GIS data on the video frames in real-time based at least in part on the geo-referencing data, wherein real-time is within a frame rate used for full motion video;
   overlaying, with the one or more computer processors, at least a portion of GIS data on the video frames based on the overlay position;
   assembling the video frames into a full motion video series; and
   enabling display of the full motion video series in real-time with the overlaid GIS data.

2. The method of claim 1, wherein the one or more video frames includes one or more series of video frames.

3. The method of claim 1, wherein the one or more video frames are captured at a full-motion video frame rate.

4. The method of claim 1, wherein one or more of the video capture devices are secured to a moving platform or mounted on a stationary platform.

5. The method of claim 1, wherein geo-referencing data includes calculating an offset of a first video frame relative to a second video frame, and using the offset to generate the geo-referencing data for at least one of the first and second video frames.

6. The method of claim 1, wherein generating geo-referencing data for the video frames further includes utilizing interior geometry calibration data of the one or more video frame capture devices.

7. The method of claim 1, wherein overlaying the GIS data on the video frames utilizing the overlay position forms composite video frames having overlaid GIS data, and wherein the method further comprises storing the composite video frames in real-time.

8. The method of claim 7, further comprising the steps of assembling the composite video frames into a full motion video series.

9. The method of claim 7, wherein the composite video frames are stored over the video frames.

10. The method of claim 7, wherein the composite video frames are stored separately from the video frames.

11. The method of claim 1, further comprising providing the video frames with the overlaid GIS data via a website in real-time.

12. The method of claim 1, wherein the overlay position includes one or more video frame pixel row and one or more video frame pixel column.

13. A method, comprising the steps of:
   receiving, with a computer system, a series of video frames having pixels of a geographic area captured by one or more camera from a moving platform, geographic position data and orientation data of the one or more camera, and interior geometry calibration data for the one or more camera;
   performing, by the computer system, in real-time, the following steps for the video frames:
      analyzing pixels of the video frames to generate geo-referencing data for one or more of the video frames utilizing the geographic position data, the orientation data, and the interior geometry calibration data, wherein the geo-referencing data comprises geographic locations of pixels of the video frame;

determining geographical boundaries of the video frames from the geo-referencing data, based at least in part on geographic coordinates of corners of the video frames, which are based on the geo-referencing data for pixels of the video frames;

accessing geographic information system (GIS) data using one or more of the determined geographical boundaries of the video frames;

determining an overlay position of the GIS data relative to the video frames for which geo-referencing data is generated in real-time based at least in part on the generated geo-referencing data, wherein real-time is within a frame rate used for full motion video;

assembling the video frames into a full motion video series; and enabling display of the full motion video series in real-time with the overlaid GIS data.

14. The method of claim 13, further comprising the steps of overlaying the GIS data on the video frames utilizing the overlay position of the GIS data to form composite video frames having overlaid GIS data.

15. The method of claim 14, further comprising the steps of assembling the composite video frames into the full motion video series.

16. The method of claim 14, wherein the composite video frames are stored over the video frames or separately from the video frames.

17. The method of claim 13, wherein the step of geo-referencing data includes the step of calculating an offset of a first video frame relative to a second video frame, and using the offset to generate the geo-referencing data for at least one of the first and second video frames.

18. A computer system, comprising:
one or more processors; and
one or more non-transitory memory storing processor executable code and interior geometry calibration data for one or more cameras, the one or more non-transitory memory communicating with the one or more processor;

wherein the processor executable code, when executed by the one or more processors, causes the one or more processors to:

analyze pixels of video frames, captured by one or more camera, to generate geo-referencing data for one or more of the video frames by utilizing data related to the camera, including geographic position data, orientation data, and interior geometry calibration data, wherein the geo-referencing data comprises geographic locations of the pixels of the video frames;

determine geographical boundaries of the video frames from the geo-referencing data, based at least in part on geographic coordinates of corners of the video frames, which are based on the geo-referencing data for pixels of the video frames;

access geographic information system (GIS) data using one or more of the determined geographical boundaries of the video frames;

determine an overlay position of the GIS data relative to the video frames for which geo-referencing data is generated in real-time based at least in part on the generated geo-referencing data, wherein real-time is within a frame rate used for full motion video;

associate the GIS data with the video frames utilizing the overlay position of the GIS data;

assemble the video frames into a full motion video series; and enable display of the full motion video series in real-time with the overlaid GIS data.

19. The computer system of claim 18, wherein geo-referencing data includes calculating an offset of a first video frame relative to a second video frame of the video frames, and using the offset to generate the geo-referencing data for at least one of the first and second video frames.

* * * * *

UNITED STATES PATENT AND TRADEMARK OFFICE
CERTIFICATE OF CORRECTION

| | | |
|---|---|---|
| PATENT NO. | : 11,941,778 B2 | Page 1 of 1 |
| APPLICATION NO. | : 16/443111 | |
| DATED | : March 26, 2024 | |
| INVENTOR(S) | : Stephen L. Schultz | |

It is certified that error appears in the above-identified patent and that said Letters Patent is hereby corrected as shown below:

In the Claims

Column 15, Line 55: After "capturing" delete "one" and replace with -- two --

Column 16, Line 23: After "wherein the" delete "one" and replace with -- two --

Column 16, Line 25: After "wherein the" delete "one" and replace with -- two --

Column 16, Line 45: After "video frames into" delete "a" and replace with -- the --

Signed and Sealed this
Twenty-third Day of April, 2024

*Katherine Kelly Vidal*

Katherine Kelly Vidal
*Director of the United States Patent and Trademark Office*